United States Patent
Azami et al.

(10) Patent No.: US 11,148,932 B2
(45) Date of Patent: Oct. 19, 2021

(54) LIQUID SUPPLY DEVICE, LIQUID DISCHARGE DEVICE, AND LIQUID DISCHARGE APPARATUS

(71) Applicant: Ricoh Company, Ltd., Tokyo (JP)

(72) Inventors: Hiroshi Azami, Kanagawa (JP); Fukuji Neya, Kanagawa (JP); Masanao Yuza, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/780,983

(22) Filed: Feb. 4, 2020

(65) Prior Publication Data

US 2020/0247665 A1    Aug. 6, 2020

(30) Foreign Application Priority Data

| Feb. 6, 2019 | (JP) | JP2019-019854 |
| Feb. 6, 2019 | (JP) | JP2019-019869 |
| Jan. 21, 2020 | (JP) | JP2020-007587 |
| Jan. 21, 2020 | (JP) | JP2020-007661 |

(51) Int. Cl.
- *B41J 2/175* (2006.01)
- *B67D 7/76* (2010.01)
- *B01D 19/00* (2006.01)

(52) U.S. Cl.
CPC ......... *B67D 7/763* (2013.01); *B01D 19/0063* (2013.01); *B41J 2/175* (2013.01)

(58) Field of Classification Search
CPC ....... B41J 2/175; B01D 19/0063; B67D 7/763
See application file for complete search history.

(56) References Cited

U.S. PATENT DOCUMENTS

| 2013/0076810 A1* | 3/2013 | Shibata | B41J 2/175 347/6 |
| 2014/0063138 A1 | 3/2014 | Takahagi et al. | |
| 2019/0381803 A1* | 12/2019 | Yoshida | B41J 2/175 |

FOREIGN PATENT DOCUMENTS

| JP | 2014-046607 | 3/2014 |
| JP | 2014-061704 | 4/2014 |
| JP | 2015-123726 | 7/2015 |
| WO | WO2015/125521 A1 | 8/2015 |

* cited by examiner

*Primary Examiner* — Lamson D Nguyen
(74) *Attorney, Agent, or Firm* — Xsensus LLP

(57) ABSTRACT

A liquid supply device includes a liquid discharge head, a main tank, a first sub-tank, a second sub-tank, a first channel, a degassing device, and a second channel. The liquid discharge head is configured to discharge liquid. The main tank is configured to store liquid to be supplied to the liquid discharge head. The first sub-tank is configured to store gas and liquid and connected to the main tank and the liquid discharge head. The second sub-tank is configured to store gas and liquid and connected to the first sub-tank and the liquid discharge head. The first channel connects between the main tank and the first sub-tank. The degassing device is configured to degas liquid in the first channel. The second channel connects between the second sub-tank and the first channel.

29 Claims, 16 Drawing Sheets

LIQUID SUPPLY DEVICE, LIQUID DISCHARGE DEVICE, AND LIQUID DISCHARGE APPARATUS

CROSS-REFERENCE TO RELATED APPLICATIONS

This patent application is based on and claims priority pursuant to 35 U.S.C. § 119(a) to Japanese Patent Application Nos. 2019-019869, filed on Feb. 6, 2019, 2019-019854, filed on Feb. 6, 2019, 2020-007587, filed on Jan. 21, 2020, and 2020-007661, filed on Jan. 21, 2020, in the Japan Patent Office, the entire disclosure of which is incorporated by reference herein.

BACKGROUND

Technical Field

Aspects of the present disclosure relate to a liquid supply device, a liquid discharge unit, and a liquid discharge apparatus.

Related Art

As an image forming apparatus such as a printer, a facsimile machine, a copying machine, a plotter, and a multifunction peripheral of at least two of the foregoing capabilities, there is known, for example, an ink discharge type recording apparatus including a liquid discharge head. As the liquid discharge head, a circulation type head including a supply channel to an individual liquid chamber communicated with a nozzle and a discharge channel leading to the individual liquid chamber, and including a supply port of liquid leading to the supply channel and a discharge port of liquid leading to the discharge channel is known.

As the circulation type liquid discharge head, a configuration including liquid tanks on a supply side and a discharge side (recovery side) to deliver liquid from a positive pressure side to a negative pressure side by a pressure difference between positive air and negative air in two liquid tanks and deliver the liquid from the negative pressure side to the positive pressure side by a pump, thereby circulating the liquid between the liquid tank and the head which discharges the liquid is known.

With such a circulation mechanism, it is possible to prevent the nozzle from drying and prevent sedimentation of high density pigments.

In the conventional apparatus, when refilling the liquid tank with ink, discharge operation is stopped and restarted after refilling, so that there is a problem that productivity is lowered. In particular, in a case where a volume of the liquid tank is small, ink refilling operation on the liquid tank from a refilling liquid tank is frequently performed, so that deterioration in productivity is inevitable.

SUMMARY

In an aspect of the present disclosure, there is provided a liquid supply device that includes a liquid discharge head, a main tank, a first sub-tank, a second sub-tank, a first channel, a degassing device, and a second channel. The liquid discharge head is configured to discharge liquid. The main tank is configured to store liquid to be supplied to the liquid discharge head. The first sub-tank is configured to store gas and liquid and connected to the main tank and the liquid discharge head. The second sub-tank is configured to store gas and liquid and connected to the first sub-tank and the liquid discharge head. The first channel connects between the main tank and the first sub-tank. The degassing device is configured to degas liquid in the first channel. The second channel connects between the second sub-tank and the first channel.

In another aspect of the present disclosure, there is provided a liquid supply device that includes a liquid discharge head, a main tank, a first sub-tank, a second sub-tank, a first channel, a degassing device, and a second channel. The liquid discharge head is configured to discharge liquid. The main tank is configured to store liquid to be supplied to the liquid discharge head. The first sub-tank is configured to store gas and liquid and connected to the main tank and the liquid discharge head. The second sub-tank is configured to store gas and liquid and connected to the first sub-tank and the liquid discharge head. The first channel connects between the main tank and the first sub-tank. The degassing device is configured to degas liquid in the first channel. The second channel connects between the second sub-tank and the main tank.

In still another aspect of the present disclosure, there is provided a liquid supply device that includes a liquid discharge head, a main tank, a first sub-tank, a second sub-tank, a first channel, a first degassing device, a second channel, and a second degassing device. The liquid discharge head is configured to discharge liquid. The main tank is configured to store liquid to be supplied to the liquid discharge head. The first sub-tank is configured to store gas and liquid and connected to the main tank and the liquid discharge head. The second sub-tank is configured to store gas and liquid and connected to the first sub-tank and the liquid discharge head. The first channel connects between the main tank and the first sub-tank. The first degassing device is configured to degas liquid in the first channel. The second channel connects between the second sub-tank and the first sub-tank to supply liquid from the second sub-tank to the first sub-tank. The second degassing device is configured to degas liquid in the second channel.

In still yet another aspect of the present disclosure, there is provided a liquid supply device that includes a liquid discharge head, a main tank, a first sub-tank, a second sub-tank, a first air tank, and a second air tank. The liquid discharge head is configured to discharge liquid. The main tank is configured to store liquid to be supplied to the liquid discharge head. The first sub-tank is configured to store gas and liquid and connected to the main tank and the liquid discharge head. The second sub-tank is configured to store gas and liquid and connected to the first sub-tank and the liquid discharge head. The first air tank is configured to store gas and connected to the first sub-tank. The second air tank is configured to store gas and connected to the second sub-tank.

In still yet further another aspect of the present disclosure, there is provided a liquid supply device that includes a first liquid discharge head, a second liquid discharge head, a main tank, a first sub-tank, a second sub-tank, a third sub-tank, a fourth sub-tank, a negative-pressure air tank, and a positive-pressure air tank. The first liquid discharge head is configured to discharge liquid. The second liquid discharge head is configured to discharge liquid. The main tank is configured to store liquid to be supplied to the first liquid discharge head and the second liquid discharge head. The first sub-tank is configured to store gas and liquid and connected to the main tank and the first liquid discharge head. The second sub-tank is configured to store gas and liquid and connected to the first sub-tank and the first liquid discharge head. The third sub-tank is configured to store gas and liquid and connected to the main tank and the second liquid discharge head. The fourth sub-tank is configured to store gas and liquid and connected to the third sub-tank and the second liquid discharge head. The negative-pressure air tank is configured to store gas and supply a negative air pressure. The positive-pressure air tank is configured to store gas and supply a positive air pressure.

BRIEF DESCRIPTION OF THE DRAWINGS

The aforementioned and other aspects, features, and advantages of the present disclosure would be better understood by reference to the following detailed description when considered in connection with the accompanying drawings, wherein.

Figure 1:
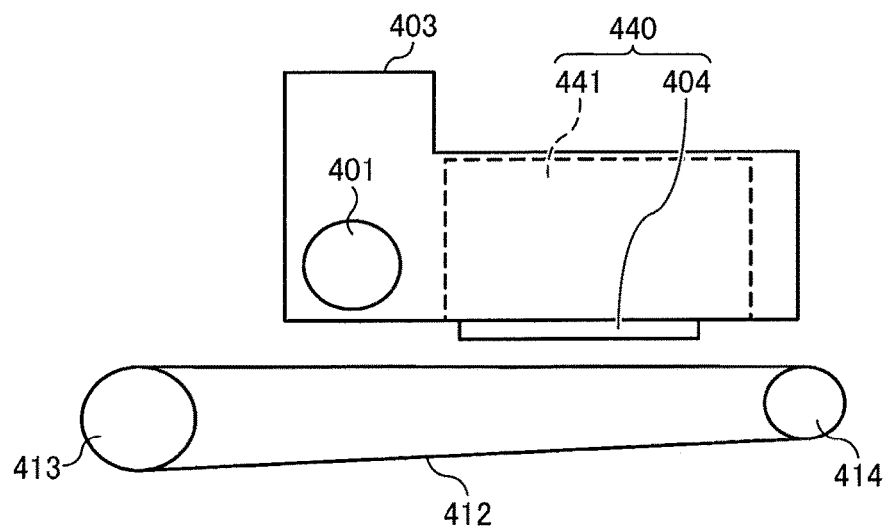
FIG. 1 is a side view illustrating an example of a liquid discharge unit.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Although the embodiments are described with technical limitations with reference to the attached drawings, such description is not intended to limit the scope of the disclosure and all of the components or elements described in the embodiments of this disclosure are not necessarily indispensable.

Referring now to the drawings, embodiments of the present disclosure are described below. In the drawings for explaining the following embodiments, the same reference codes are allocated to elements (members or components) having the same function or shape and redundant descriptions thereof are omitted below.

Hereinafter, a liquid supply device, a liquid discharge unit, and a liquid discharge apparatus according to embodiments of the present disclosure are described with reference to the drawings. Embodiments of the present disclosure are not limited to embodiments hereinafter described, and changes such as other embodiments, additions, modifications, and deletions may be made within the scope conceivable by those skilled in the art. Any aspects are included in the scope of the present disclosure as long as the actions and effects of the present invention are exhibited.

Liquid Discharge Unit

A liquid discharge unit includes a liquid supply device according to an embodiment of the present disclosure described below.

The "liquid discharge unit" is obtained by integrating another functional component and mechanism with a liquid discharge head, and is an assembly of components relating to a liquid discharge function.

For example, the "liquid discharge unit" may include a combination of a liquid discharge head with at least one of, for example, a supply mechanism of a liquid supply device according to an embodiment of the present disclosure, a carriage, a maintenance unit, and a main scan moving unit.

Examples of integrating herein include, for example, securing of the liquid discharge head, functional component, and mechanism by fastening, bonding, or engaging, and holding of one so as to be movable with respect to the other. The liquid discharge head, functional component, and mechanism may also be detachably attached to one another.

Examples of the liquid discharge unit include an integrated unit of a liquid discharge head and a head tank, an integrated unit of a liquid discharge head and a head tank that are connected to each other via, for example, a tube. A unit including a filter may also be herein added between the head tank and the liquid discharge head of the liquid discharge unit.

FIG. 1 illustrates an example of an integrated unit of a liquid discharge head and a carriage as the liquid discharge unit.

A liquid discharge unit 440 illustrated in FIG. 1 is mounted on a carriage 403. The carriage 403 is held by a guide 401 constituting part of a main scan moving unit 493 and reciprocally moves in a main scanning direction indicated by arrow "D1" in FIG. 2.

FIG. 1 illustrates a conveyance belt 412 to convey a recording medium (for example, a sheet of paper), of members constituting a liquid discharge apparatus described later. The conveyance belt 412 is an endless belt and is stretched between a conveyance roller 413 and a tension roller 414.

Figure 2:
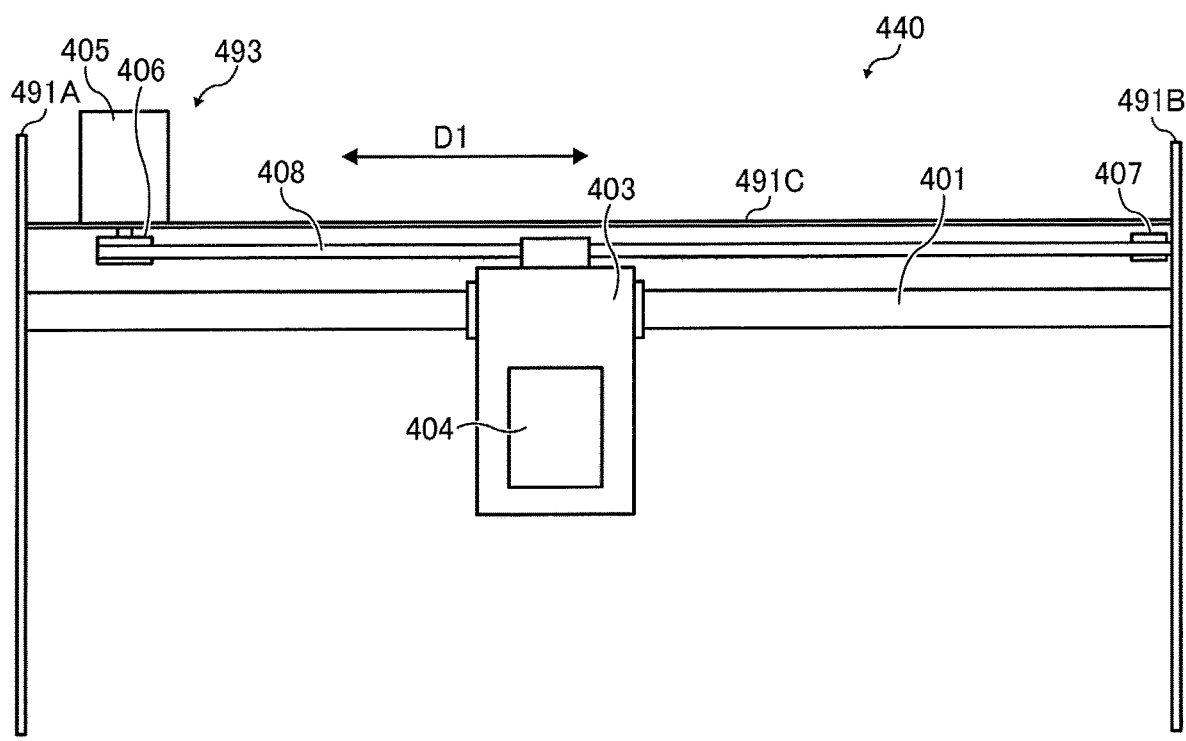
FIG. 2 is a top view illustrating an example of the liquid discharge unit.

FIG. 2 illustrates an example of an integrated unit of a liquid discharge head and a main scan moving unit as the liquid discharge unit.

For a liquid discharge unit 440 illustrated in FIG. 2, the guide 401 constituting part of the main scan moving unit 493 movably holds the liquid discharge head 404, so that the liquid discharge head 404 and a main scan moving unit 493 are integrated as a single unit. In some embodiments, the liquid discharge unit 440 may be an integrated unit in which the liquid discharge head 404, the carriage 403, and the main scan moving unit 493 are integrated as a single unit.

The main scan moving unit 493 may also include a guide only.

FIG. 2 illustrates a housing part including side plates 491A and 491B and a rear plate 491C, of members constituting a liquid discharge apparatus described later. In FIG. 2, arrow D1 indicates a main scanning direction.

In some embodiments, a cap constituting part of a maintenance unit may be secured to a carriage mounted with a liquid discharge head so that the liquid discharge head, the carriage, and the maintenance unit are integrated as a single unit to form the liquid discharge unit.

Figure 3:
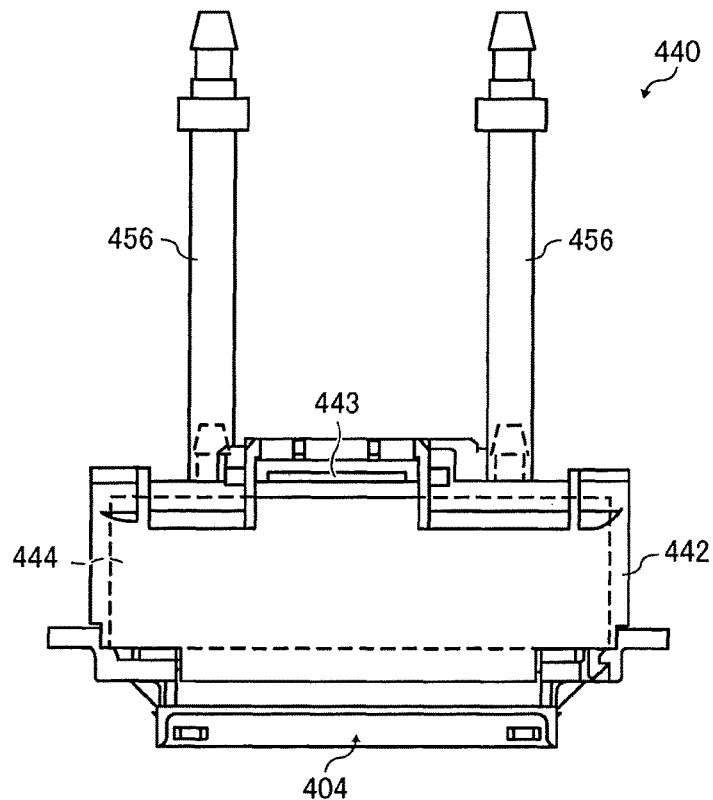
FIG. 3 is a side view illustrating an example of the liquid discharge unit.

FIG. 3 illustrates an example of a liquid discharge unit in which a tube is coupled to a liquid discharge head to which a head tank or a channel component is attached, and the liquid discharge head and the supply mechanism are integrated as a single unit.

A liquid discharge unit 440 illustrated in FIG. 3 in which a tube 456 is coupled to the liquid discharge head 404 to which a channel component 444 is attached so that the liquid discharge head 404 and a supply mechanism are integrated as a single unit. Liquid in a liquid storage source is supplied to the liquid discharge head 404 through the tube 456.

The channel component 444 is disposed inside a cover 442. Instead of the channel component 444, the liquid discharge unit 440 may include the head tank 441. A connector 443 electrically connected to the liquid discharge head 404 is provided above the channel component 444.

The integrated supply mechanism may be a tube(s) only or a loading unit only.

Liquid Discharge Apparatus

A liquid discharge apparatus according to an embodiment of the present disclosure includes a liquid supply device according to an embodiment of the present disclosure described below.

Figure 4:
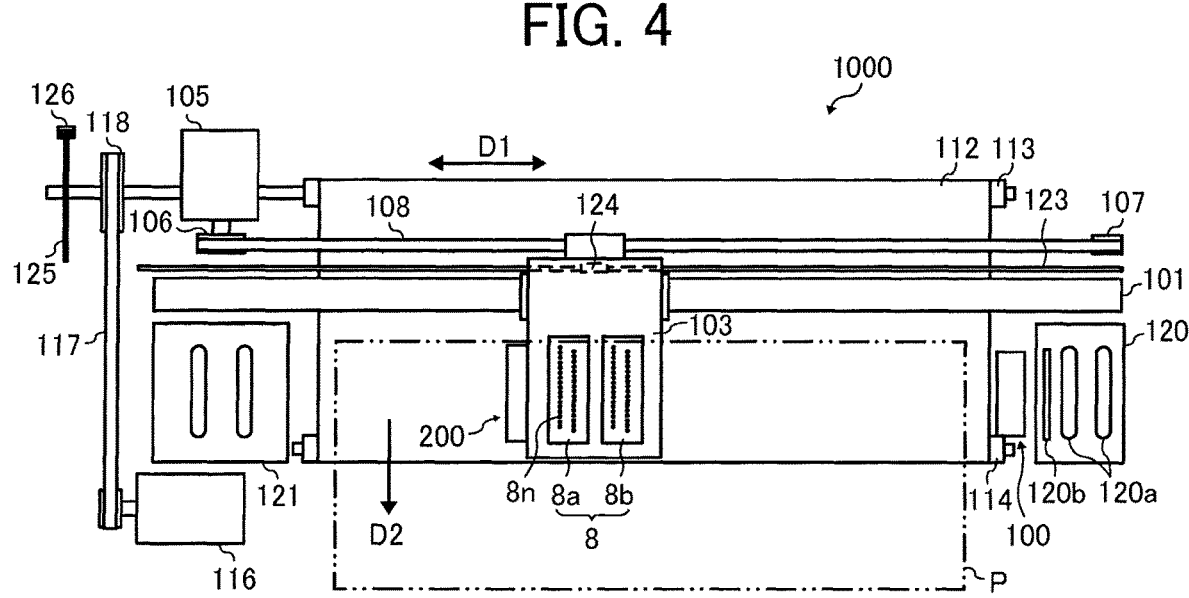
FIG. 4 is a plan view of a mechanical section in an example of a liquid discharge apparatus.

FIG. 4 illustrates a serial type image forming apparatus as an example of the liquid discharge apparatus according to the present embodiment. FIG. 4 is a plan view of a mechanical section of the liquid discharge apparatus according to the present embodiment.

A liquid supply device 300 according to the present embodiment constitutes part of a liquid discharge unit 440 in which liquid discharge heads 8 (8a and 8b) and a liquid supply assembly are integrated as a single unit. As the liquid discharge unit 440, the liquid supply device 300 is mounted in the liquid discharge apparatus 1000 illustrated as the image forming apparatus.

The liquid discharge apparatus 1000 illustrated in FIG. 4 movably holds a carriage 103 by a main guide 101, which is laterally bridged on right and left side plates, and a sub guide. A main scanning motor 105 reciprocates the carriage 103 in the main scanning direction (carriage moving direction) D1 via a timing belt 108 stretched between a driving pulley 106 and a driven pulley 107.

The liquid discharge head 8 is mounted on the carriage 103. The liquid discharge head 8 discharges ink droplets of respective colors of yellow (Y), cyan (C), magenta (M), and black (K), for example.

The liquid discharge head 8 is mounted with a nozzle line 8n including a plurality of nozzles arranged in a sub-scanning direction D2 orthogonal to the main scanning direction D1 such that a droplet discharge direction is a direction downward.

As the liquid discharge head forming the liquid discharge head 8, for example, a piezoelectric actuator such as a piezoelectric element or a thermal actuator which uses an electrothermal conversion element such as a heating resistor to use phase change due to film boiling of liquid may be used.

To convey a sheet of paper P (hereinafter referred to as "sheet P"), the liquid discharge apparatus 1000 includes a sheet conveyance belt 112 as a sheet conveyor to electrostatically attract and convey the sheet at a position facing the liquid discharge head 8. The sheet conveyance belt 112 is an endless belt and is stretched between a belt conveyance roller 113 and a tension roller 114.

When the belt conveyance roller 113 is rotationally driven by a sub-scanning motor 116 via a timing belt 117 and a timing pulley 118, the sheet conveyance belt 112 rotates to move in the sub-scanning direction D2. The sheet conveyance belt 112 is charged (charge is imparted) by a charging roller not illustrated while rotating to move.

A maintenance/recovery mechanism (cleaner) 120 which performs maintenance/recovery of the liquid discharge head 8 is arranged to the side of the sheet conveyance belt 112 on one side in the main scanning direction D1 of the carriage 103, and a dummy discharge receptacle 121 which performs dummy discharge from the liquid discharge head 8 is arranged to the side of the sheet conveyance belt 112 on the other side.

The maintenance/recovery mechanism 120 includes, for example, a cap member 120a for capping a nozzle surface (surface on which a nozzle is formed) of the liquid discharge head 8, a wiping mechanism 120b for wiping the nozzle surface, and a dummy discharge receptacle not illustrated which discharges liquid droplets not contributing to image formation and the like.

The wiping mechanism 120b may include at least an elongated wiping member capable of absorbing liquid to be described later, and may further include a blade-shaped member formed of an elastic material (for example, rubber and the like).

A discharge detection unit 100 is arranged outside a recording area between the sheet conveyance belt 112 and the maintenance/recovery mechanism 120 and in an area capable of facing the liquid discharge head 8. The carriage 103 is provided with a cleaning unit 200 for cleaning an electrode plate of the discharge detection unit 100.

An encoder scale 123 with a predetermined pattern formed is stretched between both side plates in the main scanning direction D1 of the carriage 103, and the carriage 103 is provided with an encoder sensor 124 including a transmission type photosensor which reads the pattern of the encoder scale 123. The encoder scale 123 and the encoder sensor 124 configure a linear encoder (main scanning encoder) that detects movement of the carriage 103.

A code wheel 125 is attached to a shaft of the belt conveyance roller 113, and an encoder sensor 126 including a transmission type photosensor which detects a pattern formed on the code wheel 125 is provided. The code wheel 125 and the encoder sensor 126 form a rotary encoder (sub-scanning encoder) which detects a moving amount and a moving position of the sheet conveyance belt 112.

In the image forming apparatus (the liquid discharge apparatus 1000) configured in this manner, a sheet P is fed from a sheet feeding tray not illustrated onto the sheet conveyance belt 112 which is charged to be attracted, and the sheet P is conveyed in the sub-scanning direction D2 by rotary movement of the sheet conveyance belt 112.

Therefore, by driving the liquid discharge head 8 according to an image signal while moving the carriage 103 in the main scanning direction D1, ink droplets are discharged onto the stopped sheet P to record one line. After the sheet P is conveyed by a predetermined amount, a next line is recorded.

Upon reception of a recording end signal or a signal indicating that a trailing edge of the sheet P reaches the recording area, recording operation is terminated and the sheet P is ejected to an ejection tray not illustrated.

Liquid Supply Device

FIGS. 5A to 5D are schematic views illustrating examples of a liquid supply device according to an embodiment of the present disclosure. FIG. 6 is an external view illustrating an example of the liquid supply device according to an embodiment of the present disclosure. Arrows in the drawings indicate directions in which liquid or gas flows.

The liquid supply device 300 according to an embodiment of the present disclosure includes at least a liquid discharge head 8, a main tank 1, a first sub-tank, a second sub-tank, a first channel 11, a degassing device 21, and a second channel (bypass channel) 22. The liquid discharge head 8 discharges liquid. The main tank 1 stores liquid to be supplied to the liquid discharge head 8. The first sub-tank stores gas and liquid and is connected to the main tank 1 and the liquid discharge head 8. The second sub-tank stores gas and liquid and is connected to the first sub-tank and the liquid discharge head 8. The first channel 11 connects the main tank 1 and the first sub-tank. The degassing device 21 degasses liquid in the first channel 11. The second channel 22 is communicated with the second sub-tank.

The second channel 22 preferably includes a mechanism of controlling the flow rate of liquid in the second channel 22. Controlling the flow rate of liquid in the second channel 22 allows setting of an appropriate flow rate for processing capacity of the degassing device 21, thus allowing degassing performance to be sufficiently obtained.

Examples of the mechanism of controlling the flow rate include channel resistance, electromagnetic valves, and pumps.

First Embodiment

Example 1

Figure 5A:
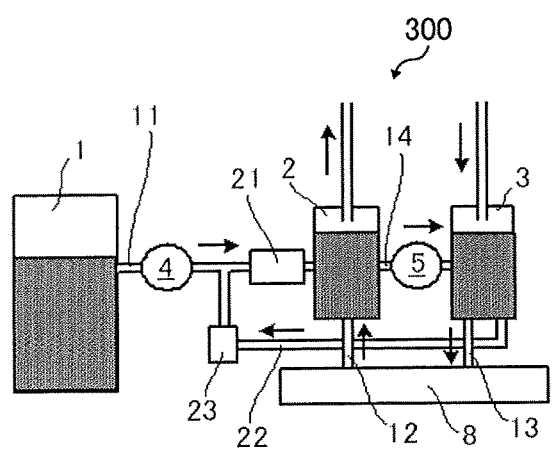
FIGS. 5A to 5D are schematic views illustrating examples of a configuration of a liquid supply device according to a first embodiment.
Figure 6:
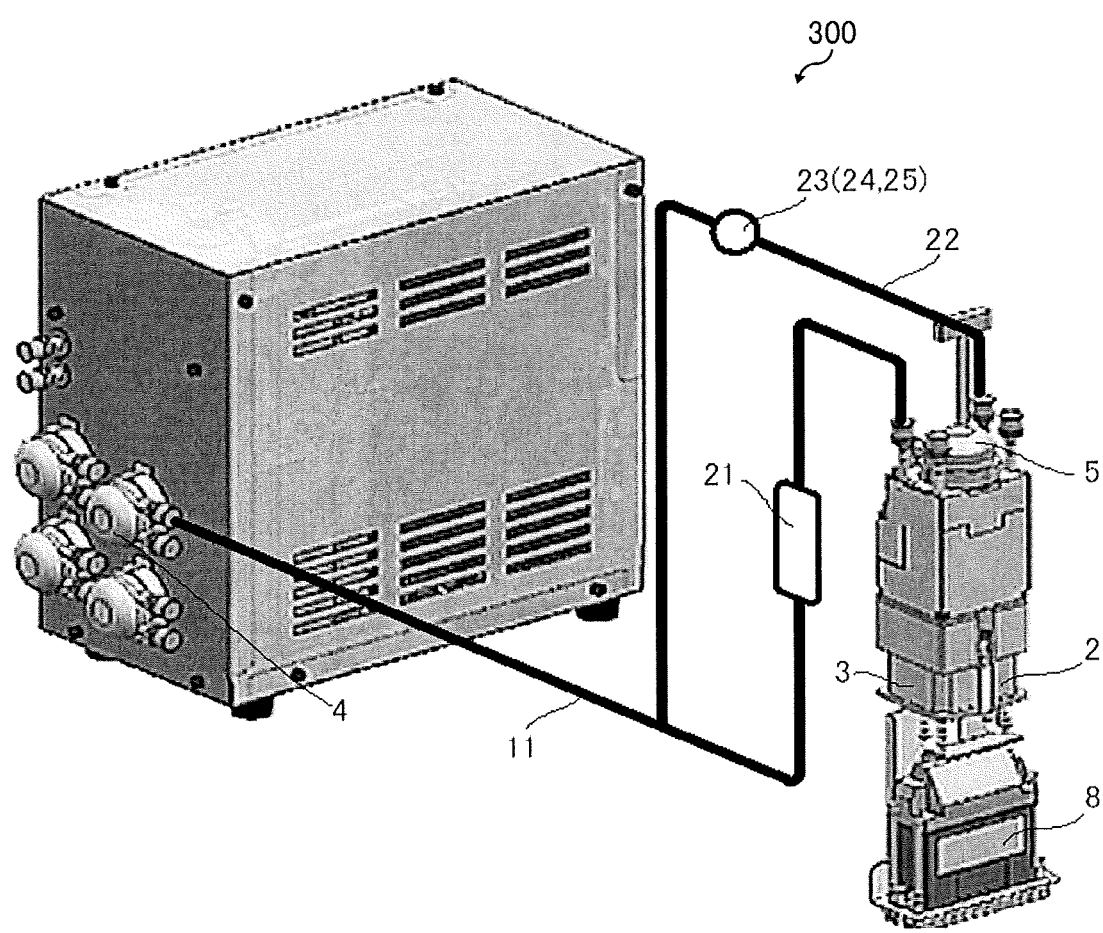
FIG. 6 is an external view illustrating an example of the liquid supply device according to the first embodiment.

FIG. 5A and FIG. 6 illustrate an example of the liquid supply device according to the first embodiment.

The liquid supply device 300 according to the present example illustrated in FIG. 5A includes a liquid discharge head 8, a main tank 1, a first sub-tank, a second sub-tank, a first channel 11, a degassing device 21, and a second channel (bypass channel) 22. The liquid discharge head 8 discharges liquid. The main tank 1 stores liquid to be supplied to the liquid discharge head 8. The first sub-tank stores gas and liquid and is connected to the main tank 1 and the liquid discharge head 8. The second sub-tank stores gas and liquid and is connected to the first sub-tank and the liquid discharge head 8. The first channel 11 connects the main tank 1 and the first sub-tank. The degassing device 21 degasses liquid in the first channel 11. The second channel 22 connects the second sub-tank and the first channel 11.

In the liquid supply device 300 according to the present example, the second channel 22 includes a channel resistance 23 as a mechanism of controlling the flow rate of liquid in the second channel 22.

Examples of the channel resistance 23 include a channel resistance such as a fine tube of a fixed resistance value and a channel resistance such as a needle valve of a resistance value that is arbitrarily adjustable.

Note that, in the present example, the first sub-tank is a negative-pressure sub-tank 2 to collect liquid from the liquid discharge head 8 and the second sub-tank is a positive-pressure sub-tank 3 to supply liquid to the liquid discharge head 8.

The liquid supply device 300 according to the present example includes a first liquid supply pump 4 and a second liquid supply pump 5. The first liquid supply pump 4 is connected between the main tank 1 and the first sub-tank (the negative-pressure sub-tank 2) to supply liquid from the main tank 1 to the first sub-tank (the negative-pressure sub-tank 2). The second liquid supply pump 5 is connected between the first sub-tank (the negative-pressure sub-tank 2) and the second sub-tank (the positive-pressure sub-tank 3) to supply liquid from the first sub-tank (the negative-pressure sub-tank 2) to the second sub-tank (the positive-pressure sub-tank 3).

The liquid is sent from the main tank 1 to the negative-pressure sub-tank 2 by the liquid supply pump 4. The liquid sent to the negative-pressure sub-tank 2 is sent to the positive-pressure sub-tank 3 by the second liquid supply pump 5 as a circulation pump. The liquid sent to the positive-pressure sub-tank 3 is sent to the negative-pressure sub-tank 2 via the liquid discharge head 8 by a pressure difference from the negative-pressure sub-tank 2 and/or by the second channel 22 as the bypass channel.

The second channel (bypass channel) 22 of the liquid supply device 300 of the present example is connected to the first channel 11 on the upstream side of the degassing device 21.

The position at which the second channel (bypass channel) 22 is connected to the first channel 11 is not particularly limited but may be any position that is on the upstream side from the degassing device 21 regardless of being on the upstream side or downstream side from the first liquid supply pump 4.

The above-described configuration can maintain a state in which the liquid is constantly degassed in the second channel (bypass channel) 22. Even if gas is dissolved inside the negative-pressure sub-tank 2 and the positive-pressure sub-tank 3, circulating the liquid to the upstream side of the degassing device 21 allows the degassed liquid to be supplied to the negative-pressure sub-tank 2.

Figure 13:
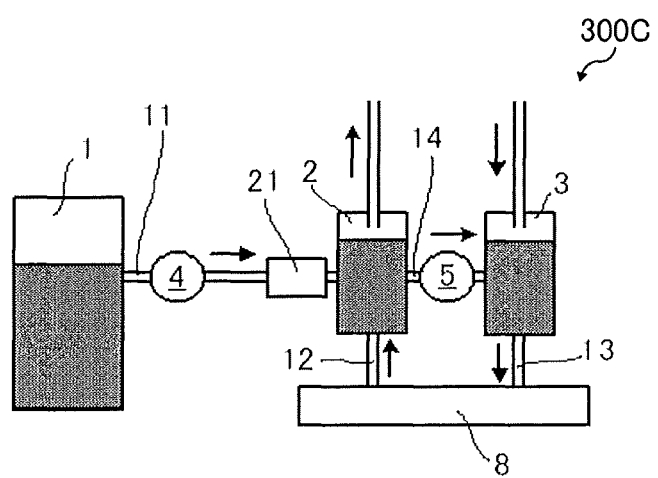
FIG. 13 is a schematic view illustrating a comparative example of a liquid supply device.

A liquid supply device according to a comparative example is illustrated in FIG. 13.

As illustrated in FIG. 13, since the second channel (bypass channel) 22 is not provided in a liquid supply device 300C according to the comparative example, the liquid in the positive-pressure sub-tank 3 is sent to the negative-pressure sub-tank 2 through the liquid discharge head 8 by the pressure difference. Accordingly, it may be difficult to constantly maintain the circulating liquid in a degassed state.

On the other hand, the liquid supply device 300 of the present example constantly can keep the circulating liquid in the degassed state and prevent the occurrence of bubbles due to dissolved gas in the liquid and the occurrence of defective discharge in the liquid discharge head 8 due to dissolved gas in the liquid.

Example 2

Figure 5B:
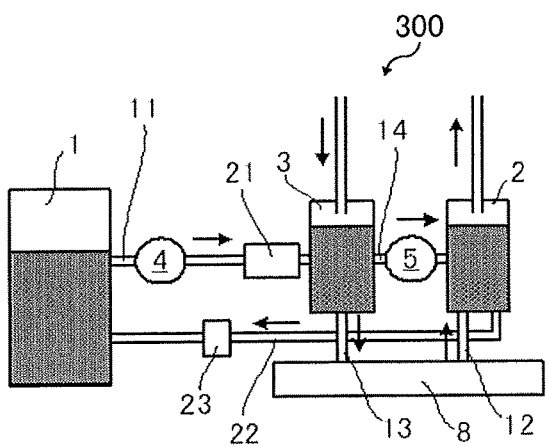

FIG. 5B illustrates the liquid supply device according to a variation of the first embodiment.

In the liquid supply device 300 according to the present example, the first sub-tank is a negative-pressure sub-tank 2 to collect liquid from the liquid discharge head 8, and the second sub-tank is a positive-pressure sub-tank 3 to supply liquid to the liquid discharge head 8, The liquid supply device 300 according to the present example includes a first liquid supply pump 4 and a second liquid supply pump 5. The first liquid supply pump 4 is connected between the main tank 1 and the first sub-tank (the positive-pressure sub-tank 3) to supply liquid from the main tank 1 to the first sub-tank (the positive-pressure sub-tank 3). The second liquid supply pump 5 is connected between the first sub-tank (the positive-pressure sub-tank 3) and the second sub-tank (the negative-pressure sub-tank 2) to supply liquid from the first sub-tank (the positive-pressure sub-tank 3) to the second sub-tank (the negative-pressure sub-tank 2).

The liquid is sent from the main tank 1 to the positive-pressure sub-tank 3 by the first liquid supply pump 4. The liquid sent to the positive-pressure sub-tank 3 is sent to the negative-pressure sub-tank 2 by the second liquid supply pump (circulation pump) 5. The liquid sent to the negative-pressure sub-tank 2 is sent to the positive-pressure sub-tank 3 through the second channel (bypass channel) 22.

Except for the configuration described above, the configuration of the present example is the same as the configuration of Example 1 illustrated in FIG. 5A.

In the liquid supply device 300 of Example 1, the main tank 1 is connected to the negative-pressure sub-tank 2. In the liquid supply device of the present example, the main tank 1 is connected to the positive-pressure sub-tank 3.

As described above, the sub-tank connected to the main tank 1 may be any of the negative-pressure sub-tank 2 and the positive-pressure sub-tank 3.

However, from the viewpoint of reducing the occurrence of pressure fluctuation, the configuration of Example 1 in which the sub-tank connected to the main tank 1 is the negative-pressure sub-tank 2 is more preferable.

Example 3

Figure 5C:
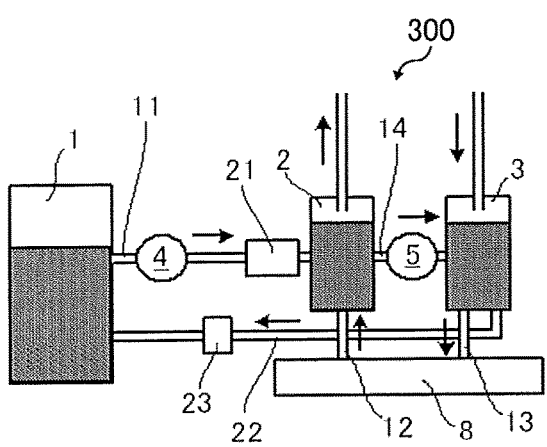

FIG. 5C illustrates the liquid supply device according to a variation of the first embodiment.

The liquid supply device 300 according to the present example illustrated in FIG. 5C includes a liquid discharge head 8, a main tank 1, a first sub-tank, a second sub-tank, a first channel 11, a degassing device 21, and a second channel (bypass channel) 22. The liquid discharge head 8 discharges liquid. The main tank 1 stores liquid to be supplied to the liquid discharge head 8. The first sub-tank stores gas and liquid and is connected to the main tank 1 and the liquid discharge head 8. The second sub-tank stores gas and liquid and is connected to the first sub-tank and the liquid discharge head 8. The first channel 11 connects the main tank 1 and the first sub-tank. The degassing device 21 degasses liquid in the first channel 11. The second channel 22 connects the second sub-tank and the main tank 1.

In the liquid supply device 300 according to the present example, the second channel 22 includes a channel resistance 23 as a mechanism of controlling the flow rate of liquid in the second channel 22.

The liquid supply device 300 according to the present example includes a first liquid supply pump 4 and a second liquid supply pump 5. The first liquid supply pump 4 is connected between the main tank 1 and the first sub-tank (the negative-pressure sub-tank 2) to supply liquid from the main tank 1 to the first sub-tank (the negative-pressure sub-tank 2). The second liquid supply pump 5 is connected between the first sub-tank (the negative-pressure sub-tank 2) and the second sub-tank (the positive-pressure sub-tank 3) to supply liquid from the first sub-tank (the negative-pressure sub-tank 2) to the second sub-tank (the positive-pressure sub-tank 3).

The liquid is sent from the main tank 1 to the negative-pressure sub-tank 2 by the liquid supply pump 4. The liquid sent to the negative-pressure sub-tank 2 is sent to the positive-pressure sub-tank 3 by the second liquid supply pump 5 as a circulation pump. The liquid sent to the positive-pressure sub-tank 3 is sent to the negative-pressure sub-tank 2 via the liquid discharge head 8 by a pressure difference from the negative-pressure sub-tank 2 or is sent to the main tank 1 by the second channel (bypass channel) 22.

In the liquid supply device 300 of the present example, the second channel (bypass channel) 22 is connected to the main tank 1. Such a configuration can reduce the amount of dissolved gas up to the liquid in the main tank 1 and maintain a state in which the amount of gas dissolved in the liquid is low. Increasing the flow rate of an object to be circulated can exert an effect of stirring and enhance the degassing efficiency.

However, in the aspect of the present example, since the number of drives of the liquid supply pump 4 increase, the above-described Examples 1 and 2 are more advantageous from the viewpoint of the product life of the liquid supply pump 4.

The liquid supply device 300 of the present example has the same configuration as the configuration of Example 1 except that the connection destination of the second channel (bypass channel) 22 is the main tank 1.

Further, similarly to Example 2, the first sub-tank connected to the main tank 1 can be the positive-pressure sub-tank 3.

Example 4

FIG. 7D illustrates the liquid supply device according to a variation of the first embodiment.

Figure 5D:
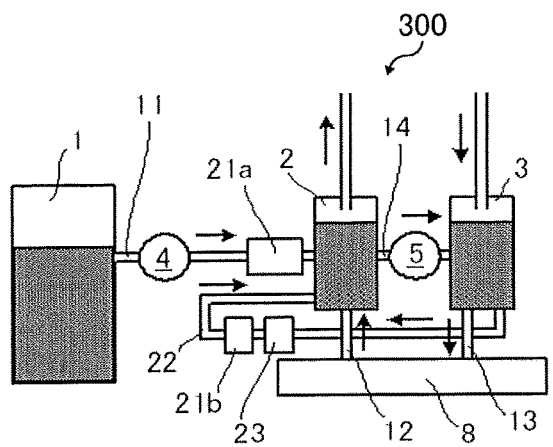

The liquid supply device 300 according to the present example illustrated in FIG. 5D includes a liquid discharge head 8, a main tank 1, a first sub-tank, a second sub-tank, a first channel 11, a first degassing device 21a, a second channel (bypass channel) 22, and a second degassing device 21b. The liquid discharge head 8 discharges liquid. The main tank 1 stores liquid to be supplied to the liquid discharge head 8. The first sub-tank stores gas and liquid and is connected to the main tank 1 and the liquid discharge head 8. The second sub-tank stores gas and liquid and is connected to the first sub-tank and the liquid discharge head 8. The first channel 11 connects the main tank 1 and the first sub-tank. The first degassing device 21a degasses liquid in the first channel 11. The second channel 22 connects the second sub-tank and the first sub-tank to supply liquid from the second sub-tank to the first sub-tank. The second degassing device 21b degasses liquid in the second channel 22.

In the liquid supply device 300 according to the present example, the second channel 22 includes a channel resistance 23 as a mechanism of controlling the flow rate of liquid in the second channel 22.

The liquid supply device 300 according to the present example includes a first liquid supply pump 4 and a second liquid supply pump 5. The first liquid supply pump 4 is connected between the main tank 1 and the first sub-tank (the negative-pressure sub-tank 2) to supply liquid from the main tank 1 to the first sub-tank (the negative-pressure sub-tank 2). The second liquid supply pump 5 is connected between the first sub-tank (the negative-pressure sub-tank 2) and the second sub-tank (the positive-pressure sub-tank 3) to supply liquid from the first sub-tank (the negative-pressure sub-tank 2) to the second sub-tank (the positive-pressure sub-tank 3).

The liquid is sent from the main tank 1 to the negative-pressure sub-tank 2 by the liquid supply pump 4. The liquid sent to the negative-pressure sub-tank 2 is sent to the positive-pressure sub-tank 3 by the second liquid supply pump 5 as a circulation pump. The liquid sent to the positive-pressure sub-tank 3 is sent to the negative-pressure sub-tank 2 via the liquid discharge head 8 by a pressure difference from the negative-pressure sub-tank 2 or by the second channel 22 as the bypass channel.

In the liquid supply device 300 of the present embodiment, the second channel (bypass channel) 22 is directly connected to the first sub-tank, and the liquid from the second sub-tank is supplied to the first sub-tank in a state of being degassed by the second degassing device 21b.

Such a configuration allows the liquid supplied to the first sub-tank to be constantly maintained in a degassed state. Circulating the liquid allows the degassed liquid to be also supplied to the negative-pressure sub-tank 2.

The liquid supply device 300 of the present example has the same configuration as the configuration of Example 1 except that the connection destination of the second channel (bypass channel) 22 is the main tank 1.

Further, similarly to Example 2, the first sub-tank connected to the main tank 1 can be the positive-pressure sub-tank 3.

Second Embodiment

Example 5

Figure 7A:
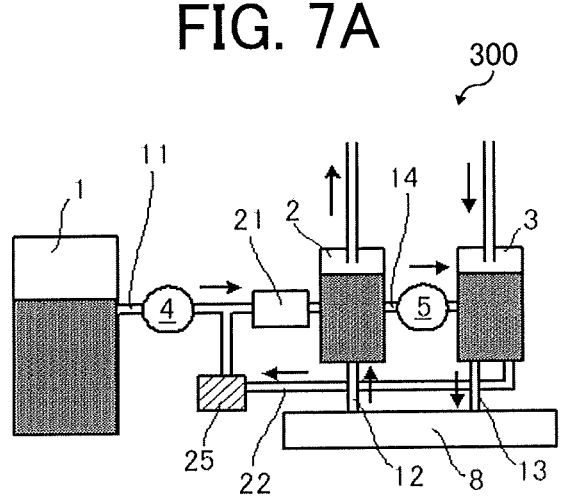
FIGS. 7A to 7C are schematic views illustrating examples of a configuration of a liquid supply device according to a second embodiment.

FIG. 7A illustrates an example of the liquid supply device according to the second embodiment.

The liquid supply device 300 of the present example is similar to the liquid supply device 300 of Example 1 illustrated in FIG. 5A except that the liquid supply device 300 of the present example includes an electromagnetic valve 25 to control the flow rate of liquid in the channel.

The electromagnetic valve 25 is not particularly limited but any electromagnetic valve that can open and close to control the flow rate of liquid.

Further, the second channel (bypass channel) 22 may be branched from the electromagnetic valve 25 to two or more degassing channels 20 to switch the valve to control the apparent flow control.

In the present example, the first sub-tank is the negative-pressure sub-tank 2 to collect liquid from the liquid discharge head 8, and the second sub-tank is the positive-pressure sub-tank 3 to supply liquid to the liquid discharge head 8. However, similarly to Example 2, the first sub-tank connected to the main tank 1 can be the positive-pressure sub-tank 3.

Example 6

Figure 7B:
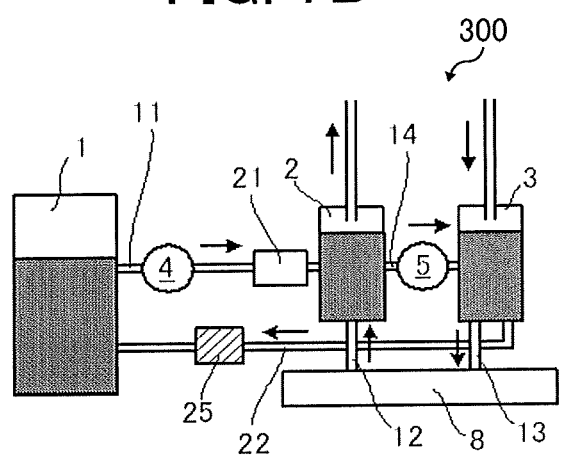

FIG. 7B illustrates the liquid supply device according to a variation of the second embodiment.

The liquid supply device 300 of the present example is similar to the liquid supply device 300 of Example 3 illustrated in FIG. 5C except that the liquid supply device 300 of the present example includes an electromagnetic valve 25 to control the flow rate of liquid in the channel.

The electromagnetic valve 25 is not particularly limited but any electromagnetic valve that can open and close to control the flow rate of liquid.

Further, the second channel (bypass channel) 22 may be branched from the electromagnetic valve 25 to two or more degassing channels 20 to switch the valve to control the apparent flow control.

In the present example, the first sub-tank is the negative-pressure sub-tank 2 to collect liquid from the liquid discharge head 8, and the second sub-tank is the positive-pressure sub-tank 3 to supply liquid to the liquid discharge head 8. However, similarly to Example 2, the first sub-tank connected to the main tank 1 can be the positive-pressure sub-tank 3.

Example 7

Figure 7C:
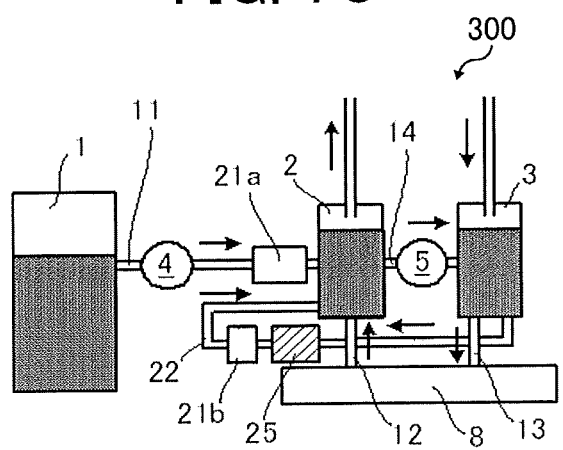

FIG. 7C illustrates the liquid supply device according to a variation of the second embodiment.

The liquid supply device 300 of the present example is similar to the liquid supply device 300 of Example 4 illustrated in FIG. 5D except that the liquid supply device 300 of the present example includes an electromagnetic valve 25 to control the flow rate of liquid in the channel.

The electromagnetic valve 25 is not particularly limited but any electromagnetic valve that can open and close to control the flow rate of liquid.

Further, the second channel (bypass channel) 22 may be branched from the electromagnetic valve 25 to two or more degassing channels 20 to switch the valve to control the apparent flow control.

In the present example, the first sub-tank is the negative-pressure sub-tank 2 to collect liquid from the liquid discharge head 8, and the second sub-tank is the positive-pressure sub-tank 3 to supply liquid to the liquid discharge head 8. However, similarly to Example 2, the first sub-tank connected to the main tank 1 can be the positive-pressure sub-tank 3.

Third Embodiment

Example 8

Figure 8A:
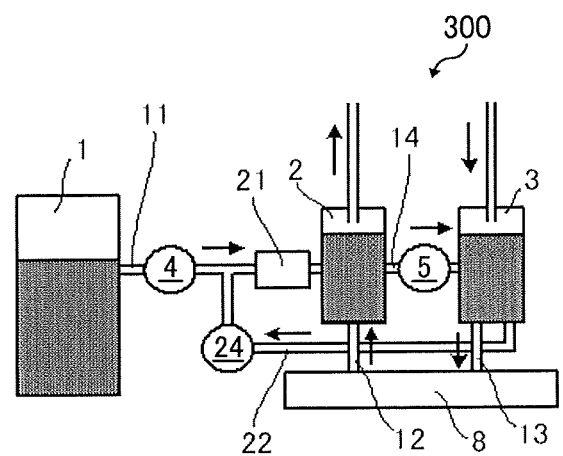
FIGS. 8A to 8C are schematic views illustrating examples of a configuration of a liquid supply device according to a third embodiment.

FIG. 8A illustrates an example of the liquid supply device according to the second embodiment.

The liquid supply device 300 of the present example is similar to the liquid supply device 300 of Example 1 illustrated in FIG. 5A except that the liquid supply device 300 of the present example includes a degassing pump 24 to control the flow rate of liquid in the channel.

The degassing pump 24 is not particularly limited but may be any pump that can drive to control the flow rate. On preferable example of the pump is a volume type pump such as a tube pump. In another example, the degassing pump 24 may be a syringe pump to control the flow rate of liquid by a reciprocating operation, with a check valve provided in the second channel (bypass channel) 22.

In the present example, the first sub-tank is the negative-pressure sub-tank 2 to collect liquid from the liquid discharge head 8, and the second sub-tank is the positive-pressure sub-tank 3 to supply liquid to the liquid discharge head 8. However, similarly to Example 2, the first sub-tank connected to the main tank 1 can be the positive-pressure sub-tank 3.

Example 9

Figure 8B:
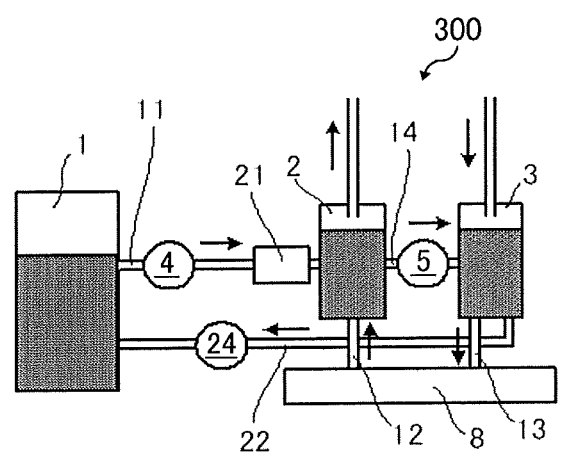

FIG. 8B illustrates the liquid supply device according to a variation of the third embodiment.

The liquid supply device 300 of the present example is similar to the liquid supply device 300 of Example 3 illustrated in FIG. 5C except that the liquid supply device 300 of the present example includes a degassing pump 24 to control the flow rate of liquid in the channel.

The degassing pump 24 is not particularly limited but may be any pump that can drive to control the flow rate. On preferable example of the pump is a volume type pump such as a tube pump. In another example, the degassing pump 24 may be a syringe pump to control the flow rate of liquid by a reciprocating operation, with a check valve provided in the second channel (bypass channel) 22.

In the present example, the first sub-tank is the negative-pressure sub-tank 2 to collect liquid from the liquid discharge head 8, and the second sub-tank is the positive-pressure sub-tank 3 to supply liquid to the liquid discharge head 8. However, similarly to Example 2, the first sub-tank connected to the main tank 1 can be the positive-pressure sub-tank 3.

Example 10

Figure 8C:
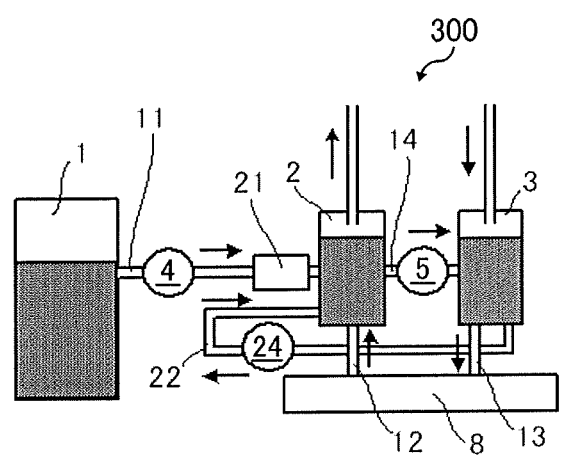

FIG. 8C illustrates the liquid supply device according to a variation of the third embodiment.

In the liquid supply device 300 according to the present example, the second channel 22 includes a degassing pump 24 as a mechanism of controlling the flow rate of liquid in the second channel 22. A second degassing device to degas the liquid in the second channel also serves as a degassing pump as a mechanism of controlling the flow rate. Therefore, only the degassing pump 24 is provided in the second channel (bypass channel) 22. The configuration of the present example is the same as the configuration of Example 4 illustrated in FIG. 5I) except for the configuration on the second channel (bypass channel) 22.

The degassing pump is not particularly limited but may be any pump that can drive to control the flow rate. On preferable example of the pump is a volume type pump such as a tube pump. In another example, the degassing pump 24 may be a syringe pump to control the flow rate of liquid by a reciprocating operation, with a check valve provided in the second channel (bypass channel) 22.

In the present example, the first sub-tank is the negative-pressure sub-tank 2 to collect liquid from the liquid discharge head 8, and the second sub-tank is the positive-pressure sub-tank 3 to supply liquid to the liquid discharge head 8. However, similarly to Example 2, the first sub-tank connected to the main tank 1 can be the positive-pressure sub-tank 3.

Fourth Embodiment

Example 11

Figure 9A:
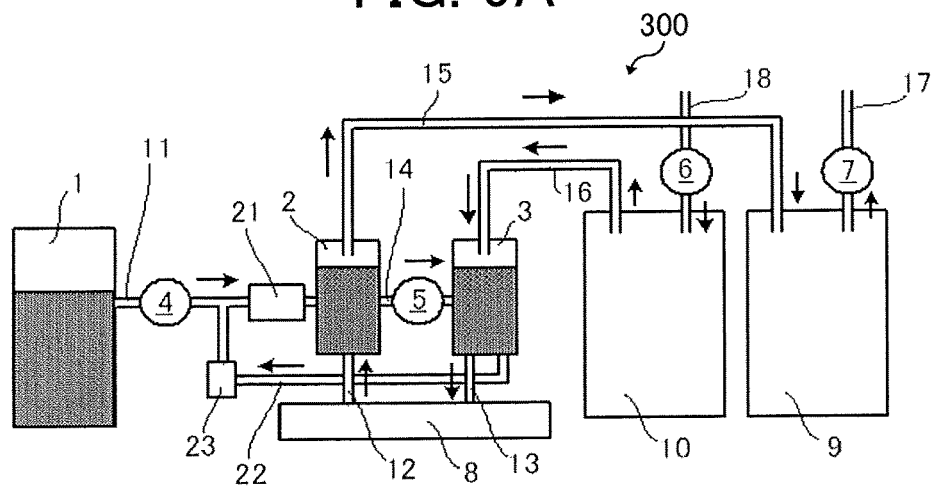
FIGS. 9A to 9C are schematic views illustrating examples of a configuration of a liquid supply device according to a fourth embodiment.

FIG. 9A illustrates an example of the liquid supply device according to the fourth embodiment.

The liquid supply device 300 according to the present example is similar to Example 1 illustrated in FIG. 5A except that the liquid supply device 300 according to the present example includes a negative-pressure air tank 9 and a positive-pressure air tank 10. The negative-pressure air tank 9 contains a gas and is connected to the negative-pressure sub-tank 2 to supply a negative air pressure. The positive-pressure air tank 10 contains a gas and is connected to the positive-pressure sub-tank 3 to supply a positive air pressure.

The liquid supply device 300 of the present example further includes a decompression air pump 7 and a pressurizing air pump 6. The decompression air pump 7 is connected to the negative-pressure air tank 9 to reduce the pressure of the negative-pressure air tank 9. The pressurizing air pump 6 is connected to the positive-pressure air tank 10 to pressurize the positive-pressure air tank 10.

The liquid supply device 300 according to the present example includes a first negative-pressure air channel 15, a second negative-pressure air channel 17, a first positive-pressure air channel 16, and a second positive-pressure air channel 18. The first negative-pressure air channel 15 connects the negative-pressure sub-tank 2 and the negative-pressure air tank 9. The second negative-pressure air channel 17 is communicated with the negative-pressure air tank 9 and connected to the decompression air pump 7. The first positive-pressure air channel 16 connects the positive-pressure sub-tank 3 and the positive-pressure air tank 10. The second positive-pressure air channel 18 is communicated with the positive-pressure air tank 10 and connected to the pressurizing air pump 6.

A volume of the air tank (the positive-pressure air tank 10 and the negative-pressure air tank 9) is preferably larger than a volume of the sub-tank (the positive-pressure sub-tank 3 and the negative-pressure sub-tank 2).

As described above, in the liquid supply device 300 of the present embodiment, the positive-pressure sub-tank 3 and the negative-pressure sub-tank 2 are arranged above the liquid discharge head 8. The positive-pressure air tank 10 and the negative-pressure air tank 9 can be provided as separate components at different positions from the positive-pressure sub-tank 3 and the negative-pressure sub-tank 2, respectively, As described above, connecting the air tanks can increase the air volume in each sub-tank, so that an air damper effect can be obtained.

As a result, in addition to the effect of preventing the generation of bubbles due to the dissolved gas and the occurrence of discharge failure in the liquid discharge head 8 due to the dissolved gas, the width of the pulsation during circulation by the driving of the pump and the occurrence of large pressure fluctuations during the discharge of the liquid can be reduced.

In the present example, the first sub-tank is the negative-pressure sub-tank 2 to collect liquid from the liquid discharge head 8, and the second sub-tank is the positive-pressure sub-tank 3 to supply liquid to the liquid discharge head 8. However, similarly to Example 2, the first sub-tank connected to the main tank 1 can be the positive-pressure sub-tank 3.

Example 12

Figure 9B:
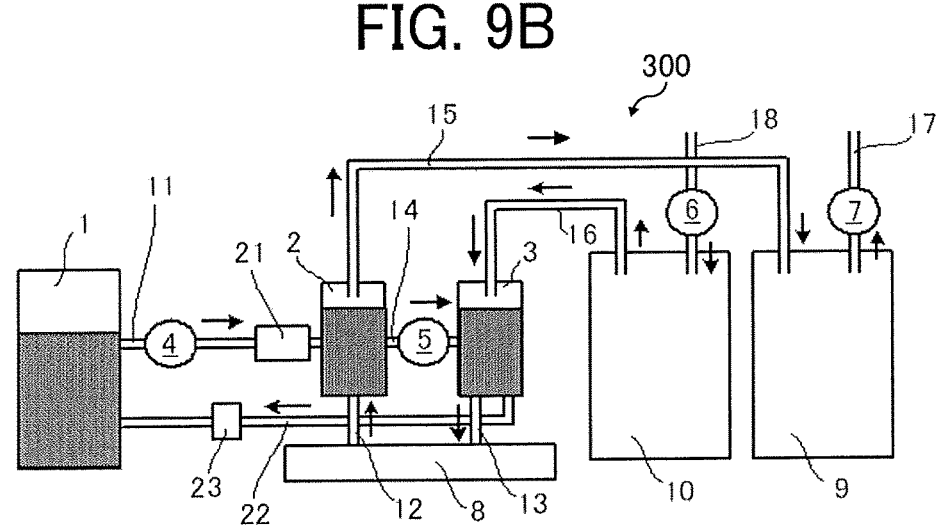

FIG. 9B illustrates the liquid supply device according to a variation of the fourth embodiment.

The liquid supply device 300 according to the present example is similar to Example 3 illustrated in FIG. 5C except that the liquid supply device 300 according to the present example includes a negative-pressure air tank 9 and a positive-pressure air tank 10. The negative-pressure air tank 9 contains a gas and is connected to the negative-pressure sub-tank 2 to supply a negative air pressure. The positive-pressure air tank 10 contains a gas and is connected to the positive-pressure sub-tank 3 to supply a positive air pressure.

The liquid supply device 300 of the present example further includes a decompression air pump 7 and a pressurizing air pump 6. The decompression air pump 7 is connected to the negative-pressure air tank 9 to reduce the pressure of the negative-pressure air tank 9. The pressurizing air pump 6 is connected to the positive-pressure air tank 10 to pressurize the positive-pressure air tank 10.

The liquid supply device 300 according to the present example includes a first negative-pressure air channel 15, a second negative-pressure air channel 17, a first positive-pressure air channel 16, and a second positive-pressure air channel 18. The first negative-pressure air channel 15 connects the negative-pressure sub-tank 2 and the negative-pressure air tank 9. The second negative-pressure air channel 17 is communicated with the negative-pressure air tank 9 and connected to the decompression air pump 7. The first positive-pressure air channel 16 connects the positive-pressure sub-tank 3 and the positive-pressure air tank 10. The second positive-pressure air channel 18 is communicated with the positive-pressure air tank 10 and connected to the pressurizing air pump 6.

In the present example, the first sub-tank is the negative-pressure sub-tank 2 to collect liquid from the liquid discharge head 8, and the second sub-tank is the positive-pressure sub-tank 3 to supply liquid to the liquid discharge head 8. However, similarly to Example 2, the first sub-tank connected to the main tank 1 can be the positive-pressure sub-tank 3.

Example 13

Figure 9C:
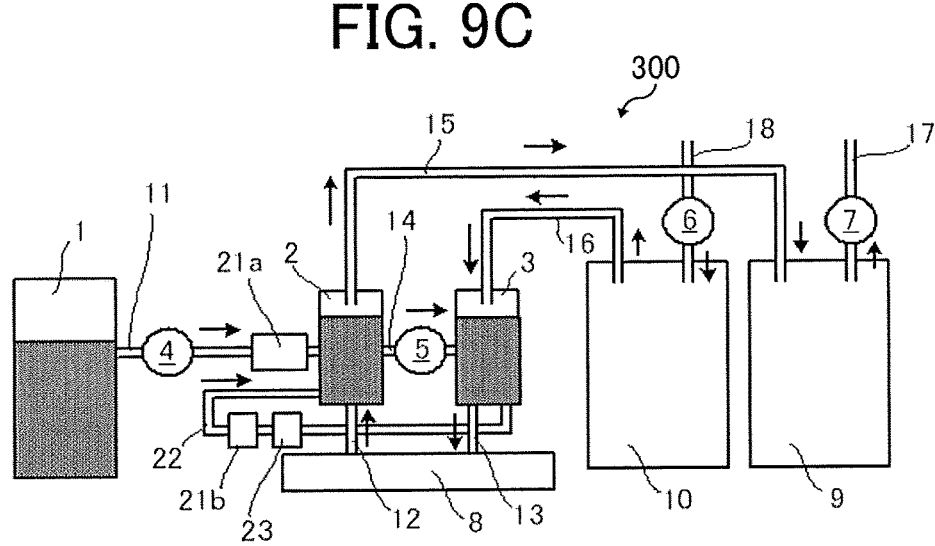

FIG. 9C illustrates the liquid supply device according to a variation of the fourth embodiment.

The liquid supply device 300 according to the present example is similar to Example 4 illustrated in FIG. 5D except that the liquid supply device 300 according to the present example includes a negative-pressure air tank 9 and a positive-pressure air tank 10. The negative-pressure air tank 9 contains a gas and is connected to the negative-pressure sub-tank 2 to supply a negative air pressure. The positive-pressure air tank 10 contains a gas and is connected to the positive-pressure sub-tank 3 to supply a positive air pressure.

The liquid supply device 300 of the present example further includes a decompression air pump 7 and a pressurizing air pump 6. The decompression air pump 7 is connected to the negative-pressure air tank 9 to reduce the pressure of the negative-pressure air tank 9. The pressurizing air pump 6 is connected to the positive-pressure air tank 10 to pressurize the positive-pressure air tank 10.

The liquid supply device 300 according to the present example includes a first negative-pressure air channel 15, a second negative-pressure air channel 17, a first positive-pressure air channel 16, and a second positive-pressure air channel 18. The first negative-pressure air channel 15 connects the negative-pressure sub-tank 2 and the negative-pressure air tank 9. The second negative-pressure air channel 17 is communicated with the negative-pressure air tank 9 and connected to the decompression air pump 7. The first positive-pressure air channel 16 connects the positive-pressure sub-tank 3 and the positive-pressure air tank 10. The second positive-pressure air channel 18 is communicated with the positive-pressure air tank 10 and connected to the pressurizing air pump 6.

In the present example, the first sub-tank is the negative-pressure sub-tank 2 to collect liquid from the liquid discharge head 8, and the second sub-tank is the positive-pressure sub-tank 3 to supply liquid to the liquid discharge head 8. However, similarly to Example 2, the first sub-tank connected to the main tank 1 can be the positive-pressure sub-tank 3.

Fifth Embodiment

Example 14

Figure 10:
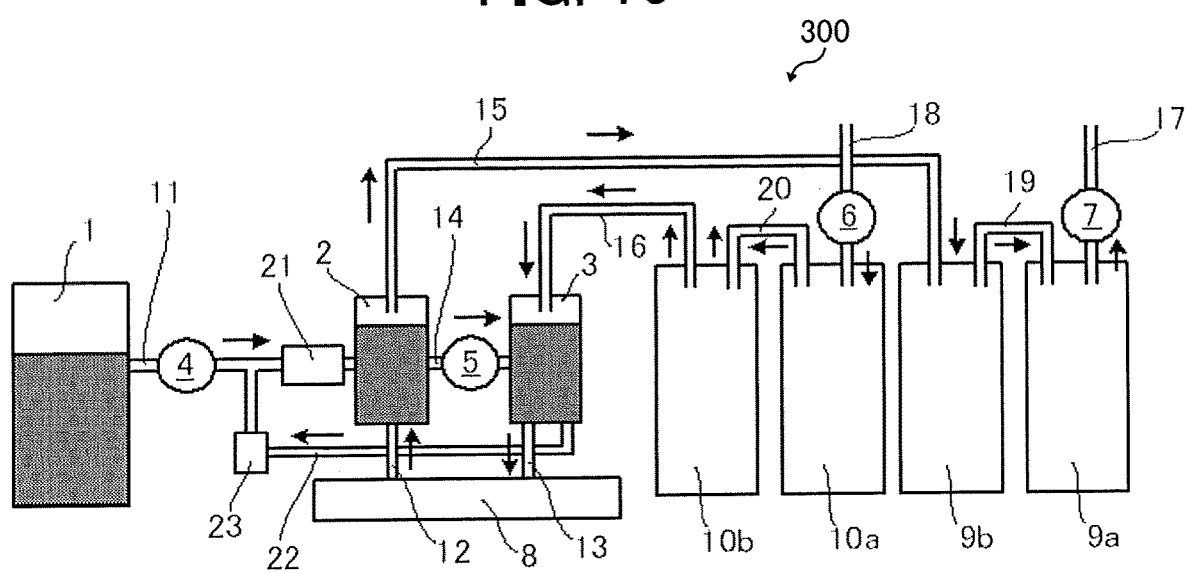
FIG. 10 is a schematic view illustrating an example of a configuration of a liquid supply device according to a fifth embodiment.

FIG. 10 illustrates an example of the liquid supply device according to the fifth embodiment.

The liquid supply device 300 according to the present example is the same as Example 11 illustrated in FIG. 9A, except that the liquid supply device 300 according to the present example further includes an additional negative-pressure air tank 9b and an additional positive-pressure air tank 10b. The additional negative-pressure air tank 9b is connected between a negative-pressure air tank 9a and the negative-pressure sub-tank 2. The additional positive-pressure air tank 10b is connected between a positive-pressure air tank 10a and the positive-pressure sub-tank 3.

As described above, connecting the additional air tanks can increase the air volume in each sub-tank, so that a more excellent air damper effect can be obtained.

As a result, in addition to the effect of preventing the generation of bubbles due to the dissolved gas and the occurrence of discharge failure in the liquid discharge head 8 due to the dissolved gas, the width of the pulsation during circulation by the driving of the pump and the occurrence of large pressure fluctuations during the discharge of the liquid can be reduced.

In the present example, the first sub-tank is the negative-pressure sub-tank 2 to collect liquid from the liquid discharge head 8, and the second sub-tank is the positive-pressure sub-tank 3 to supply liquid to the liquid discharge head 8. However, similarly to Example 2, the first sub-tank connected to the main tank 1 can be the positive-pressure sub-tank 3.

Sixth Embodiment

Example 15

Figure 11A:
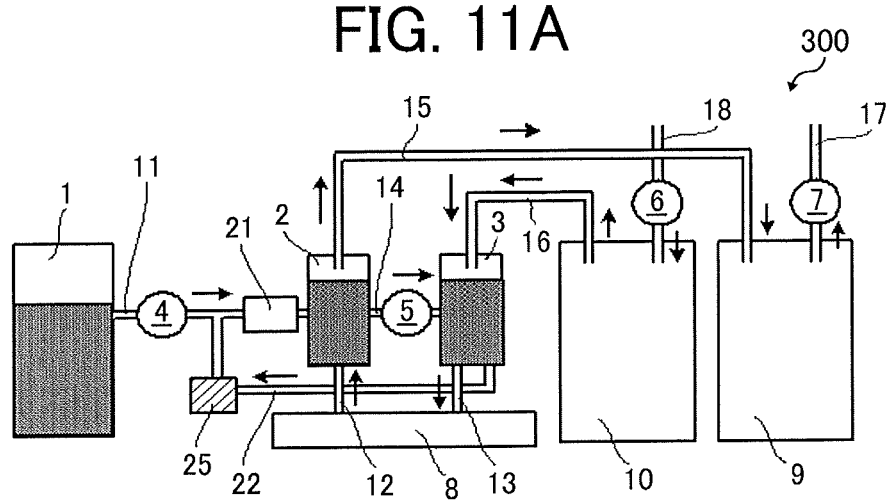
FIGS. 11A to 11C are schematic views illustrating examples of a configuration of a liquid supply device according to a sixth embodiment.

FIG. 11A illustrates an example of a liquid supply device according to the sixth embodiment.

The liquid supply device 300 according to the present example is similar to Example illustrated in FIG. 7A except that the liquid supply device 300 according to the present example includes a negative-pressure air tank 9 and a positive-pressure air tank 10. The negative-pressure air tank 9 contains a gas and is connected to the negative-pressure sub-tank 2 to supply a negative air pressure. The positive-pressure air tank 10 contains a gas and is connected to the positive-pressure sub-tank 3 to supply a positive air pressure.

The connection between the sub-tanks (the negative-pressure sub-tank 2 and the positive-pressure sub-tank 3) and the air tanks (the negative-pressure air tank 9 and the positive-pressure air tank 10) is the same as the connection of Example 11 illustrated in FIG. 9A.

In the present example, the first sub-tank is the negative-pressure sub-tank 2 to collect liquid from the liquid discharge head 8, and the second sub-tank is the positive-pressure sub-tank 3 to supply liquid to the liquid discharge head 8. However, similarly to Example 2, the first sub-tank connected to the main tank 1 can be the positive-pressure sub-tank 3.

Further, similarly to Example 14 illustrated in FIG. 10, an aspect may be adopted in which an additional air tank is provided.

Example 16

Figure 11B:
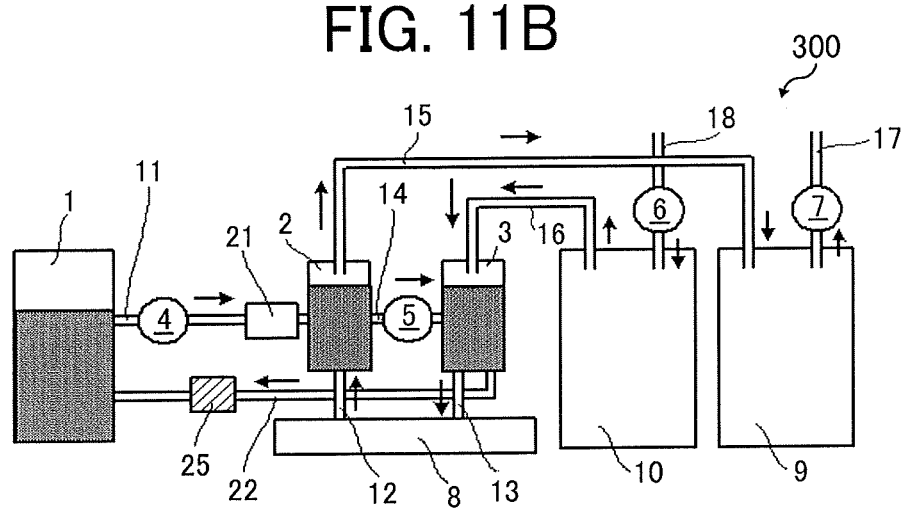

FIG. 11B illustrates the liquid supply device according to a variation of the sixth embodiment.

The liquid supply device 300 according to the present example is similar to Example 6 illustrated in FIG. 7B except that the liquid supply device 300 according to the present example includes a negative-pressure air tank 9 and a positive-pressure air tank 10. The negative-pressure air tank 9 contains a gas and is connected to the negative-pressure sub-tank 2 to supply a negative air pressure. The positive-pressure air tank 10 contains a gas and is connected to the positive-pressure sub-tank 3 to supply a positive air pressure.

The connection between the sub-tanks (the negative-pressure sub-tank 2 and the positive-pressure sub-tank 3) and the air tanks (the negative-pressure air tank 9 and the positive-pressure air tank 10) is the same as the connection of Example 11 illustrated in FIG. 9A.

In the present example, the first sub-tank is the negative-pressure sub-tank 2 to collect liquid from the liquid discharge head 8, and the second sub-tank is the positive-pressure sub-tank 3 to supply liquid to the liquid discharge head 8. However, similarly to Example 2, the first sub-tank connected to the main tank 1 can be the positive-pressure sub-tank 3.

Further, similarly to Example 14 illustrated in FIG. 10, an aspect may be adopted in which an additional air tank is provided.

Example 17

Figure 11C:
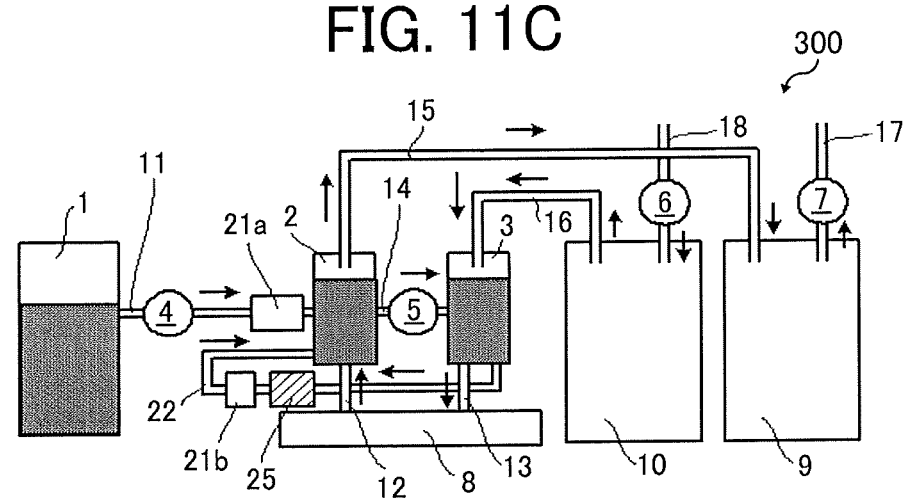

FIG. 11C illustrates the liquid supply device according to a variation of the sixth embodiment.

The liquid supply device 300 according to the present example is similar to Example 7 illustrated in FIG. 7C except that the liquid supply device 300 according to the present example includes a negative-pressure air tank 9 and a positive-pressure air tank 10. The negative-pressure air tank 9 contains a gas and is connected to the negative-pressure sub-tank 2 to supply a negative air pressure. The positive-pressure air tank 10 contains a gas and is connected to the positive-pressure sub-tank 3 to supply a positive air pressure.

The connection between the sub-tanks (the negative-pressure sub-tank 2 and the positive-pressure sub-tank 3) and the air tanks (the negative-pressure air tank 9 and the positive-pressure air tank 10) is the same as the connection of Example 11 illustrated in FIG. 9A.

In the present example, the first sub-tank is the negative-pressure sub-tank 2 to collect liquid from the liquid discharge head 8, and the second sub-tank is the positive-pressure sub-tank 3 to supply liquid to the liquid discharge head 8. However, similarly to Example 2, the first sub-tank connected to the main tank 1 can be the positive-pressure sub-tank 3.

Further, similarly to Example 14 illustrated in FIG. 10, an aspect may be adopted in which an additional air tank is provided.

Seventh Embodiment

Example 18

Figure 12A:
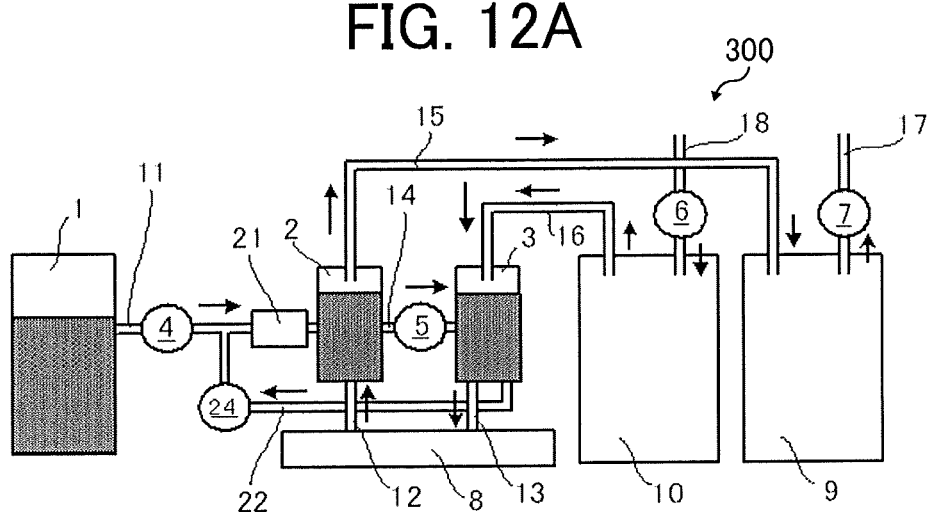
FIGS. 12A to 12C are schematic views illustrating examples of a configuration of a liquid supply device according to a seventh embodiment.

FIG. 12A illustrates an example of the liquid supply device according to the seventh embodiment.

The liquid supply device 300 according to the present example is similar to Example 8 illustrated in FIG. 8A except that the liquid supply device 300 according to the present example includes a negative-pressure air tank 9 and a positive-pressure air tank 10. The negative-pressure air tank 9 contains a gas and is connected to the negative-pressure sub-tank 2 to supply a negative air pressure. The positive-pressure air tank 10 contains a gas and is connected to the positive-pressure sub-tank 3 to supply a positive air pressure.

The connection between the sub-tanks (the negative-pressure sub-tank 2 and the positive-pressure sub-tank 3) and the air tanks (the negative-pressure air tank 9 and the positive-pressure air tank 10) is the same as the connection of Example 11 illustrated in FIG. 9A.

In the present example, the first sub-tank is the negative-pressure sub-tank 2 to collect liquid from the liquid discharge head 8, and the second sub-tank is the positive-pressure sub-tank 3 to supply liquid to the liquid discharge head 8. However, similarly to Example 2, the first sub-tank connected to the main tank 1 can be the positive-pressure sub-tank 3.

Further, similarly to Example 14 illustrated in FIG. 10, an aspect may be adopted in which an additional air tank is provided.

Example 19

Figure 12B:
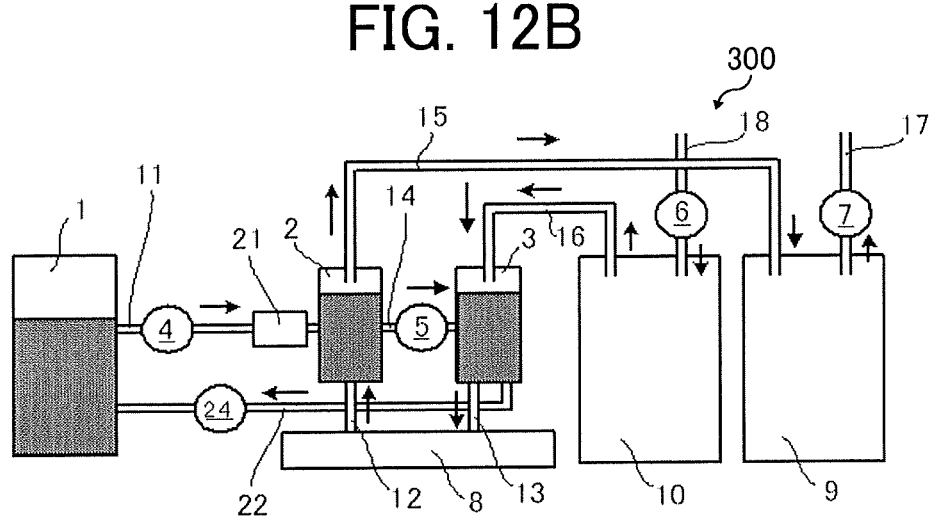

FIG. 12B illustrates the liquid supply device according to a variation of the seventh embodiment.

The liquid supply device 300 according to the present example is similar to Example 9 illustrated in FIG. 8B except that the liquid supply device 300 according to the present example includes a negative-pressure air tank 9 and a positive-pressure air tank 10. The negative-pressure air tank 9 contains a gas and is connected to the negative-pressure sub-tank 2 to supply a negative air pressure. The positive-pressure air tank 10 contains a gas and is connected to the positive-pressure sub-tank 3 to supply a positive air pressure.

The connection between the sub-tanks (the negative-pressure sub-tank 2 and the positive-pressure sub-tank 3)

and the air tanks (the negative-pressure air tank 9 and the positive-pressure air tank 10) is the same as the connection of Example 11 illustrated in FIG. 9A.

In the present example, the first sub-tank is the negative-pressure sub-tank 2 to collect liquid from the liquid discharge head 8, and the second sub-tank is the positive-pressure sub-tank 3 to supply liquid to the liquid discharge head 8. However, similarly to Example 2, the first sub-tank connected to the main tank 1 can be the positive-pressure sub-tank 3.

Further, similarly to Example 14 illustrated in FIG. 10, an aspect may be adopted in which an additional air tank is provided.

Example 20

Figure 12C:
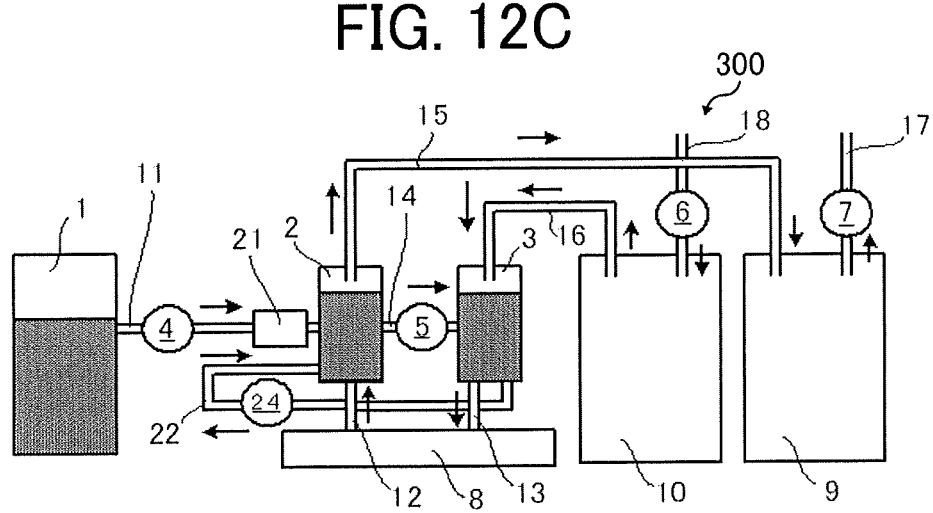

FIG. 12C illustrates the liquid supply device according to a variation of the seventh embodiment.

The liquid supply device 300 according to the present example is similar to Example illustrated in FIG. 8C except that the liquid supply device 300 according to the present example includes a negative-pressure air tank 9 and a positive-pressure air tank 10. The negative-pressure air tank 10 contains a gas and is connected to the negative-pressure sub-tank 2 to supply a negative air pressure. The positive-pressure air tank 10 contains a gas and is connected to the positive-pressure sub-tank 3 to supply a positive air pressure.

The connection between the sub-tanks (the negative-pressure sub-tank 2 and the positive-pressure sub-tank 3) and the air tanks (the negative-pressure air tank 9 and the positive-pressure air tank 10) is the same as the connection of Example 11 illustrated in FIG. 9A.

In the present example, the first sub-tank is the negative-pressure sub-tank 2 to collect liquid from the liquid discharge head 8, and the second sub-tank is the positive-pressure sub-tank 3 to supply liquid to the liquid discharge head 8. However, similarly to Example 2, the first sub-tank connected to the main tank 1 can be the positive-pressure sub-tank 3.

Further, similarly to Example 14 illustrated in FIG. 10, an aspect may be adopted in which an additional air tank is provided.

OTHER EMBODIMENTS

In the first to twentieth examples described above, the configuration has been described in which the liquid supply device includes the single liquid discharge head 8 is connected to the negative-pressure sub-tank 2 and the positive-pressure sub-tank 3 one by one. The liquid supply device is not limited to the above-described configuration but may be a configuration in which the liquid supply device includes a plurality of liquid discharge heads 8.

In an embodiment of the present disclosure, the liquid supply device may include a plurality of positive-pressure sub-tanks 3 communicated with each other, a positive-pressure air tank 10 connected to the plurality of positive-pressure sub-tanks 3, a plurality of negative-pressure sub-tanks 2 communicated with each other, and a negative-pressure air tank 9 connected to the plurality of negative-pressure sub-tanks 2.

In an embodiment of the present disclosure, the liquid supply device may include a plurality of positive-pressure sub-tanks 3 communicated with each other, a plurality of positive-pressure air tanks 10 connected to the plurality of positive-pressure sub-tanks 3, a plurality of negative-pressure sub-tanks 2 communicated with each other, and a plurality of negative-pressure air tanks 9 connected to the plurality of negative-pressure sub-tanks 2.

Liquid Supply Device

FIGS. 14A and 14B and FIGS. 16 to 21 are schematic views of examples of a liquid supply device according to some embodiments of the present disclosure. FIG. 15 is an external view illustrating an example of the liquid supply device according to an embodiment of the present disclosure. Arrows in the drawings indicate directions in which liquid or gas flows.

The liquid supply device 300 according to embodiments of the present disclosure described below includes a liquid discharge head 8, a main tank 1, a sub-tank 2, a sub-tank 3, an air tank 9, and an air tank 10. The liquid discharge head 8 discharges liquid. The main tank 1 stores liquid to be supplied to the liquid discharge head 8. The sub-tanks 2 and 3 store at least gas and are communicated with the main tank 1 and the liquid discharge head 8. The air tanks 9 and 10 store gas and are connected to the sub-tanks 2 and 3. The liquid supply device 300 includes, as the sub-tanks 2 and 3, at least a positive-pressure sub tan 3 to supply liquid to the liquid discharge head 8 and a negative-pressure sub-tank 2 to collect liquid from the liquid discharge head 8.

Eighth Embodiment

Example 21

Figure 14A:
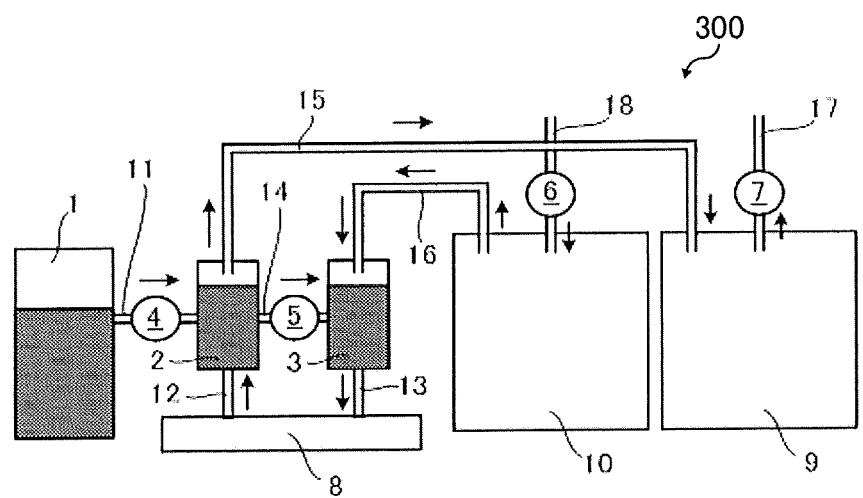
FIGS. 14A and 14B are schematic views illustrating examples of a configuration of a liquid supply device according to an eighth embodiment.
Figure 15:
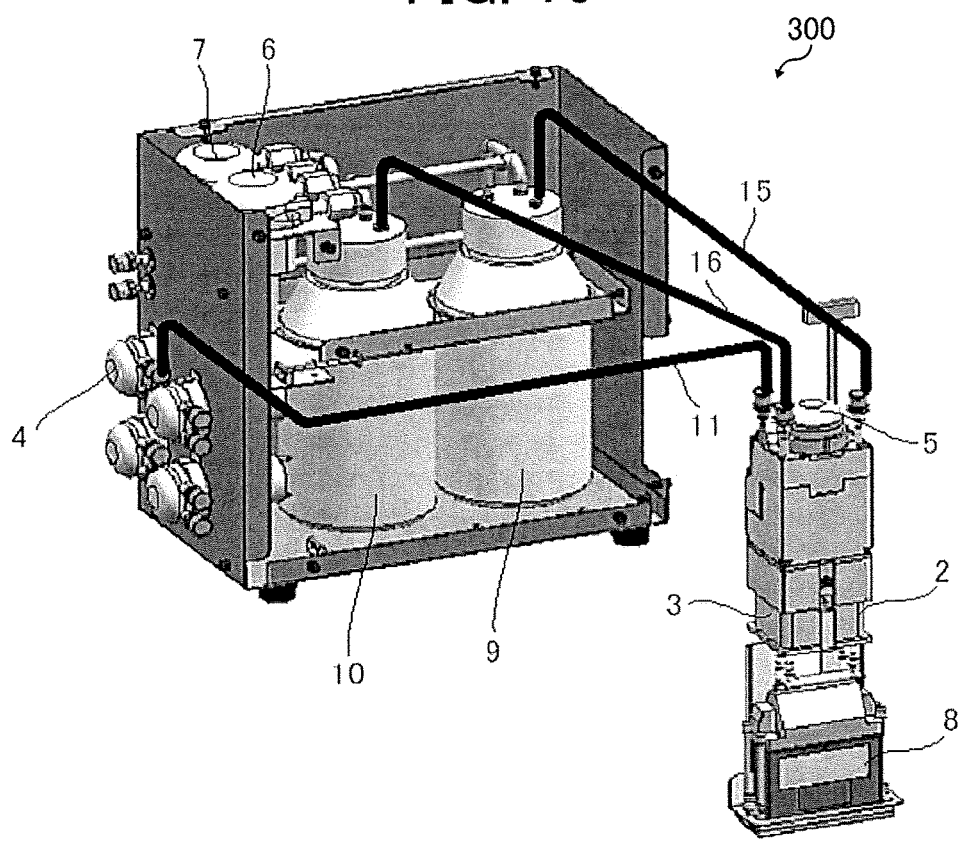
FIG. 15 is an external view illustrating an example of the liquid supply device according to the eighth embodiment.

FIG. 14A illustrates an example of the liquid supply device according to the eighth embodiment.

The liquid supply device 300 illustrated in FIG. 14A includes a liquid discharge head 8, a main tank 1, a first sub-tank, a second sub-tank, a first air tank, and a second air tank. The liquid discharge head 8 discharges liquid. The main tank 1 stores liquid to be supplied to the liquid discharge head 8. The first sub-tank stores gas and liquid and is connected to the main tank 1 and the liquid discharge head 8. The second sub-tank stores gas and liquid and is connected to the first sub-tank and the liquid discharge head 8. The first air tank stores gas and is connected to the first sub-tank. The second air tank stores gas and is connected to the second sub-tank.

In the liquid supply device 300 of the present example, the first sub-tank is the negative-pressure sub-tank 2 to collect liquid from the liquid discharge head 8, and the second sub-tank is the positive-pressure sub-tank 3 to supply liquid to the liquid discharge head 8. The first air tank is the negative-pressure air tank 9 to supply a negative air pressure. The second air tank is the positive-pressure air tank 10 to supply a positive air pressure.

Further, the liquid supply device 300 of the present example further includes a first liquid supply pump 4 and a second liquid supply pump 5 as a circulation pump. The first liquid supply pump 4 is connected between the main tank 1 and the negative-pressure sub-tank 2 to supply liquid from the main tank 1 to the negative-pressure sub-tank 2. The second liquid supply pump 5 is connected between the sub-tank 2 and the positive-pressure sub-tank 3 to supply liquid from the negative-pressure sub-tank 2 to the positive-pressure sub-tank 3.

The liquid supply device 300 of the present embodiment includes a decompression air pump 7 and a pressurizing air pump 6. The decompression air pump 7 is connected to the negative-pressure air tank 9 to reduce the pressure of the negative-pressure air tank 9. The pressurizing air pump 6 is connected to the positive-pressure air tank 10 to pressurize the positive-pressure air tank 10.

The liquid supply device 300 according to the present embodiment includes a liquid supply channel 11, a circulation channel 14, a collection channel 12, and a supply channel 13. The liquid supply channel 11 connects the main tank 1 and the negative-pressure sub-tank 2. The circulation channel 14 connects the positive-pressure sub-tank 3 and the negative-pressure sub-tank 2. The collection channel 12 connects the negative-pressure sub-tank 2 and the liquid discharge head 8. The supply channel 13 connects the positive-pressure sub-tank 3 and the liquid discharge head 8.

The liquid supply device 300 according to the present embodiment further includes a first negative-pressure air channel 15, a second negative-pressure air channel 17, a first positive-pressure air channel 16, and a second positive-pressure air channel 18. The first negative-pressure air channel 15 connects the negative-pressure sub-tank 2 and the negative-pressure air tank 9. The second negative-pressure air channel 17 is communicated with the negative-pressure air tank 9 and connected to the decompression air pump 7. The first positive-pressure air channel 16 connects the positive-pressure sub-tank 3 and the positive-pressure air tank 10. The second positive-pressure air channel 18 is communicated with the positive-pressure air tank 10 and connected to the pressurizing air pump 6.

In the liquid supply device 300 according to the present embodiment, a volume of the air tank (the positive-pressure air tank 10 and the negative-pressure air tank 9) is preferably larger than a volume of the sub-tank (the positive-pressure sub-tank 3 and the negative-pressure sub-tank 2).

A specific volume of the air tank (positive pressure air tank 10 and negative pressure air tank 9) may be appropriately selected according to the type of an apparatus on which the air tank is mounted and the volume of the sub-tank. For example, the volume of the air tank is preferably 50 mL or larger for the sub-tank that stores 20 mL of liquid. In such a case, when the volume of the air tank is smaller than 50 mL, a sufficient damper effect may not be obtained.

As described above, in the liquid supply device 300 according to the present embodiment, the small-sized positive-pressure sub-tank 3 and negative-pressure sub-tank 2 are arranged above the liquid discharge head 8. The large-volume positive-pressure air tank and negative-pressure air tank 9 are arranged as separate components at different positions from the positions of the positive-pressure sub-tank 3 and the negative-pressure sub-tank 2.

Figure 22:
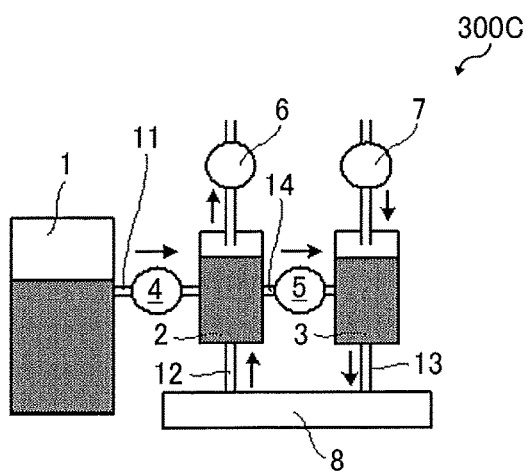
FIG. 22 is a schematic view illustrating another comparative example of a liquid supply device.

A liquid supply device according to a comparative example is illustrated in FIG. 22.

In the liquid supply device 300C according to the comparative example illustrated in FIG. 22, the negative-pressure sub-tank 2 and the decompression air pump 7 are directly connected without an air tank. Similarly, the positive-pressure sub-tank 3 and the pressurizing air pump 6 are directly connected without an air tank. Accordingly, pressure fluctuations during ink supply increase.

Figure 16:
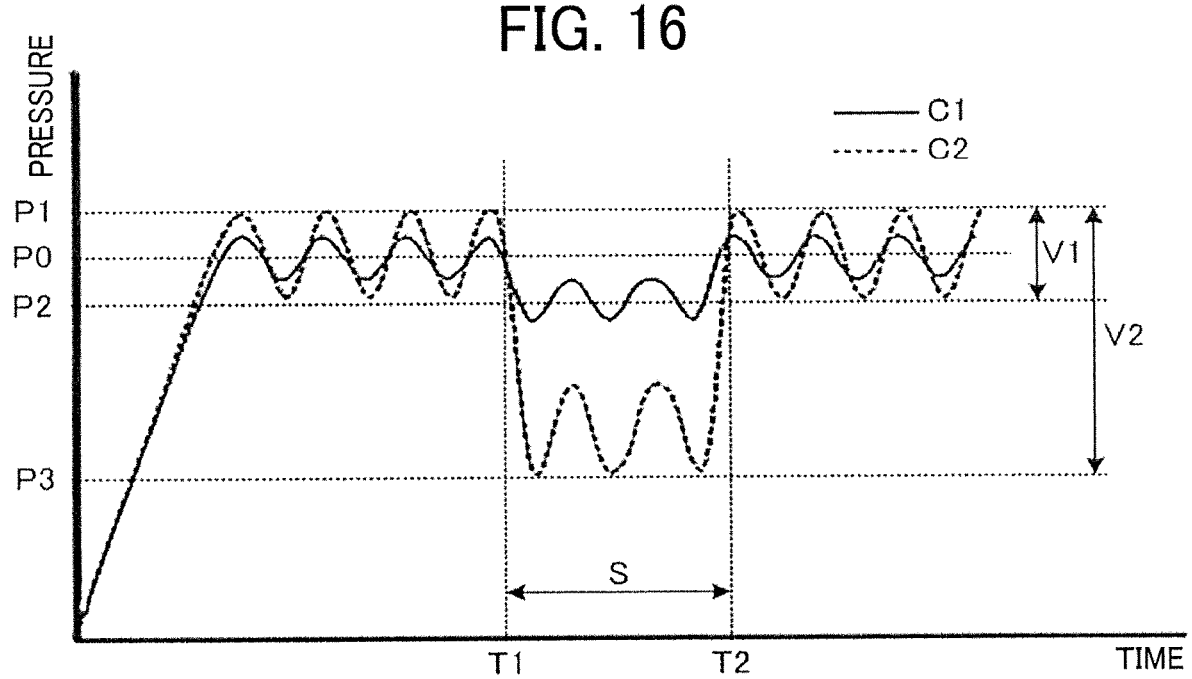
FIG. 16 is a graph conceptually illustrating a difference in pressure fluctuation depending on whether an air tank is connected.

FIG. 16 illustrates a difference in pressure fluctuation between a configuration of the present embodiment illustrated in FIG. 14A in which the air tanks are connected and a configuration of the comparative example illustrated in FIG. 22 in which no air tank is connected.

FIG. 16 is a graph conceptually illustrating pressure fluctuations in the collection channel 12 connecting the negative-pressure sub-tank 2 and the liquid discharge head 8 and the supply channel 13 connecting the positive-pressure sub-tank 3 and the liquid discharge head 8. The example of the present embodiment is indicated by solid line C1, and the comparative example is indicated by broken line C2.

In FIG. 16, P0 is a set value of circulation pressure. V1 (fluctuation between pressures P1 and P2) indicates a pulsation range during circulation in the comparative example. V2 (fluctuation between pressures P1 and P3) indicates a range of pressure fluctuation during liquid discharge.

In FIG. 3, in a period S from T1 at which the liquid discharge starts to T2 at which the liquid discharge ends, a significant pressure fluctuation V2 exceeding the pulsation range V1 occurs in the comparative example C2 in which no air tank is connected. By contrast, in the example C1 of the present embodiment, the pressure fluctuation during discharge and the pulsation width during circulation are reduced.

As described above, in the liquid supply device 300 according to the present embodiment, the sub-tanks (the positive-pressure sub-tank 3 and the negative-pressure sub-tank 2) and to the air tanks (the positive-pressure air tank 10 and the negative-pressure air tank 9) are connected, so that an apparent gas volume in the sub-tanks become the sum of the volumes of gas in the sub-tanks and the volumes of gas in the large-volume air tanks. Therefore, a large air damper effect can be obtained, thus reducing the pulsation width during circulation due to the driving of the pump and the occurrence of large pressure fluctuation during liquid discharge. Further, reducing the occurrence of pressure fluctuation can prevent the occurrence of discharge failure of the liquid discharge head.

Example 22

Figure 14B:
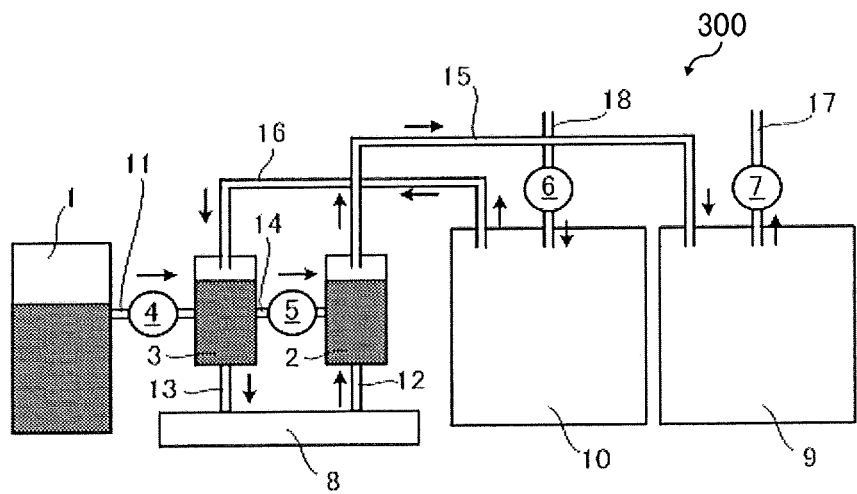

FIG. 14B illustrates the liquid supply device according to a variation of the eighth embodiment.

In the liquid supply device 300 of Example 22, the main tank 1 is connected to the negative-pressure sub-tank 2. In the liquid supply device of the present example, the main tank 1 is connected to the positive-pressure sub-tank 3.

The liquid supply device 300 illustrated in FIG. 14B includes a main tank 1, a first sub-tank, a second sub-tank, a first air tank, and a second air tank. The main tank 1 stores liquid to be supplied to the liquid discharge head 8. The first sub-tank stores gas and liquid and is connected to the main tank 1 and the liquid discharge head 8. The second sub-tank stores gas and liquid and is connected to the first sub-tank and the liquid discharge head 8. The first air tank stores gas and is connected to the first sub-tank. The second air tank stores gas and is connected to the second sub-tank. The first sub-tank is the positive-pressure sub-tank 3 to supply liquid to the liquid discharge head 8. The second sub-tank is the negative-pressure sub-tank to collect liquid from the liquid discharge head 8. The first air tank is the positive-pressure air tank 10 to supply a positive air pressure. The second air tank is the negative-pressure air tank 9 to supply a negative air pressure.

As described above, the sub-tank connected to the main tank 1 may be any of the negative-pressure sub-tank 2 and the positive-pressure sub-tank 3.

However, from the viewpoint of reducing the occurrence of pressure fluctuation, the configuration of Example 1 in which the sub-tank connected to the main tank 1 is the negative-pressure sub-tank 2 is more preferable.

Ninth Embodiment

The liquid supply device 300 according to the present embodiment includes a plurality of negative-pressure sub-tanks 2 communicated with each other, a negative-pressure air tank 9 connected to the plurality of negative-pressure sub-tanks 2, a plurality of positive-pressure sub-tanks 3 communicated with each other, and a positive-pressure air tank 10 connected to the plurality of positive-pressure sub-tanks 3.

The liquid supply device 300 according to the present embodiment further includes a decompression air pump 7 and a pressurizing air pump 6. The decompression air pump 7 is connected to the negative-pressure air tank 9 to reduce the pressure of the negative-pressure air tank 9. The pressurizing air pump 6 is connected to the positive-pressure air tank 10 to pressurize the positive-pressure air tank 10.

Example 23

Figure 17:
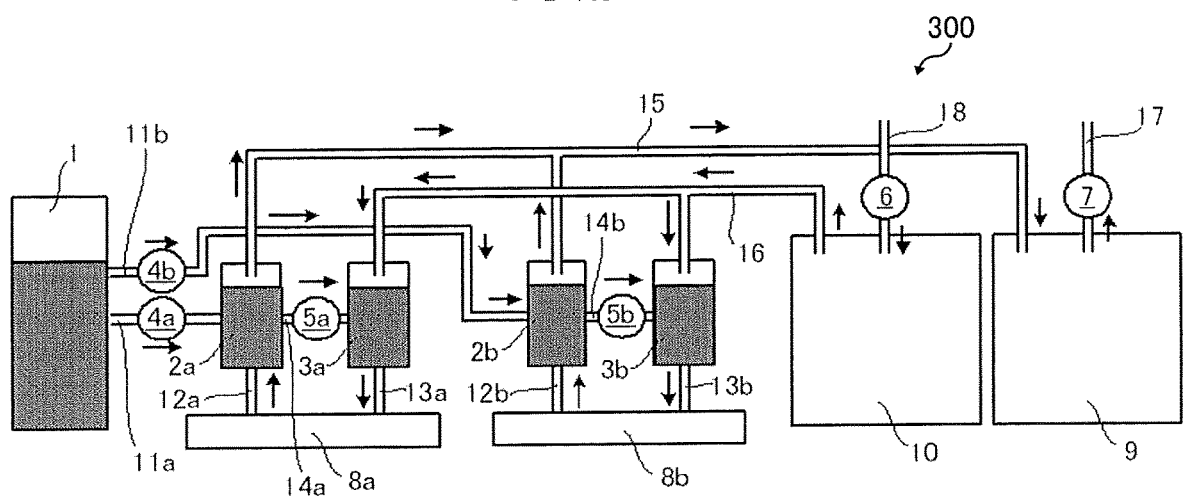
FIG. 17 is a schematic view illustrating an example of a configuration of a liquid supply device according to a ninth embodiment.

FIG. 17 illustrates an example of the liquid supply device according to the ninth embodiment.

The liquid supply device 300 illustrated in FIG. 17 includes a first liquid discharge head 8a, a second liquid discharge head 8b, a main tank 1, a first sub-tank, a second sub-tank, a third sub-tank, a fourth sub-tank, a negative-pressure air tank 9, and a positive-pressure air tank 10. The first liquid discharge head 8a and the second liquid discharge head 8b discharge liquid. The main tank 1 stores liquid to be supplied to the first liquid discharge head 8a and the second liquid discharge head 8b. The first sub-tank stores gas and liquid and is connected to the main tank 1 and the first liquid discharge head 8a. The third sub-tank stores gas and liquid and is connected to the main tank 1 and the second liquid discharge head 8b. The fourth sub-tank stores gas and liquid and is connected to the third sub-tank and the second liquid discharge head 8b. The negative-pressure air tank 9 stores gas to supply a negative air pressure. The positive-pressure air tank 10 stores gas to supply a positive air pressure.

In the liquid supply device 300 of the present embodiment, the first sub-tank and the third sub-tank are negative-pressure sub-tanks 2 (2a and 2b) to collect liquid from the liquid discharge heads 8 (8a and 8b). The second sub-tank and the fourth sub-tank are positive-pressure sub-tanks 3 (3a and 3b) to supply liquid to the liquid discharge heads 8 (8a and 8b).

The negative-pressure air tank 9 is connected to the first sub-tank (the negative-pressure sub-tank 2a) and the third sub-tank (the negative-pressure sub-tank 2b). The positive-pressure air tank 10 is connected to the second sub-tank (the positive-pressure sub-tank 3a) and the fourth sub-tank (the positive-pressure sub-tank 3b).

The liquid supply device 300 according to the present example includes a first liquid supply pump 4a, a second liquid supply pump 4b, a third liquid supply pump (circulation pump) 5a, and a fourth liquid supply pump (circulation pump) 5b. The first liquid supply pump 4a is connected between the main tank 1 and the first sub-tank to supply liquid from the main tank 1 to the first sub-tank. The second liquid supply pump 4b is connected between the main tank 1 and the third sub-tank to supply liquid from the main tank 1 to the third sub-tank. The third liquid supply pump 5a is connected between the first sub-tank and the second sub-tank to supply liquid from the first sub-tank to the second sub-tank. The fourth liquid supply pump 5b is connected to the third sub-tank and the fourth sub-tank to supply liquid from the third sub-tank to the fourth sub-tank.

In the liquid supply device 300 illustrated in FIG. 17, the first liquid supply pump 4a is connected between the main tank 1 and one negative-pressure sub-tank 2a to supply liquid from the main tank 1 to the one negative-pressure sub-tank 2a. The second liquid supply pump 4b is connected between the main tank 1 and the other negative-pressure sub-tank 2b to supply liquid from the main tank 1 to the other negative-pressure sub-tank 2b. The third liquid supply pump (circulation pump) 5a is connected between the one negative-pressure sub-tank 2a and the positive-pressure sub-tank 3a to supply liquid from the one negative-pressure sub-tank 2a to one positive-pressure sub-tank 3a. The fourth liquid supply pump (circulation pump) 5b is connected between the negative-pressure sub-tank 2b and the other positive-pressure sub-tank 3b to supply liquid from the other negative-pressure sub-tank 2b to the other positive-pressure sub-tank 3b.

The liquid supply device illustrated in FIG. 17 includes a circulation channel 14a, a circulation channel 14b, a collection channel 12a, a collection channel 12b, a supply channel 13a, and a supply channel 13b. The circulation channel 14a connects the positive-pressure sub-tank 3a and the negative-pressure sub-tank 2a. The circulation channel 14b connects the positive-pressure sub-tank 3b and the negative-pressure sub-tank 2b. The collection channel 12a connects the negative-pressure sub-tank 2a and the liquid discharge head 8a. The collection channel 12b connects the negative-pressure sub-tank 2b and the liquid discharge head 8b. The supply channel 13a connects the positive-pressure sub-tank 3a and the liquid discharge head 8a. The supply channel 13b connects the positive-pressure sub-tank 3b and the liquid discharge head 8b.

The liquid supply device 300 illustrated in FIG. 17 further includes a first negative-pressure air channel 15, a second negative-pressure air channel 17, a first positive-pressure air channel 16, and a second positive-pressure air channel 18. The first negative-pressure air channel 15 connects the negative-pressure air tank 9 to the negative-pressure sub-tanks 2a and 2b. The second negative-pressure air channel 17 is communicated with the negative-pressure air tank 9 and connected to the decompression air pump 7. The first positive-pressure air channel 16 connects the positive-pressure air tank 10 to the positive-pressure sub-tanks 3a and 3b. The second positive-pressure air channel 18 is communicated with the positive-pressure air tank 10 and connected to the pressurizing air pump 6.

As described above, even in a configuration in which the liquid supply device 300 includes a plurality of sub-tanks, connecting the air tanks to the sub-tanks can increase the air volume in each sub-tank.

Example 24

Figure 18:
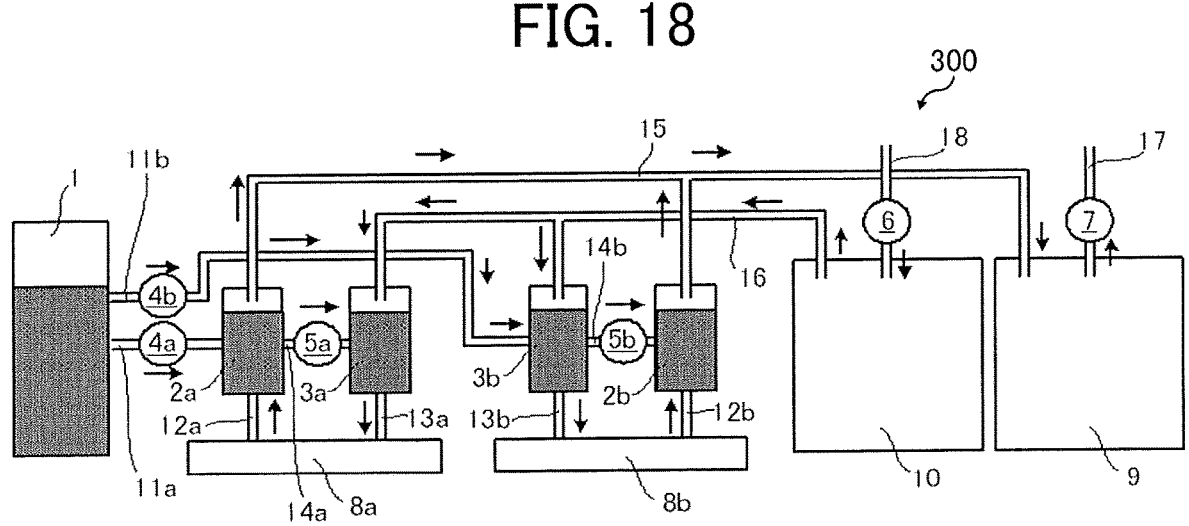
FIG. 18 is a schematic view illustrating an example of a configuration of a liquid supply device according to a variation of the ninth embodiment.

FIG. 18 illustrates a liquid supply device according to a variation of the ninth embodiment.

In the liquid supply device 300 of Example 23 described above, the main tank 1 is connected to the negative-pressure sub-tank 2a and the negative-pressure sub-tank 2b. However, in the liquid supply device 300 of the present example illustrated in FIG. 18, the main tank 1 is connected to the negative-pressure sub-tank 2a and the positive-pressure sub-tank 3b.

In the liquid supply device 300 illustrated in FIG. 18, the first sub-tank and the fourth sub-tank are the negative-pressure sub-tanks 2 (2a and 2b) to collect liquid from the liquid discharge heads 8 (8a and 8b). The second sub-tank and the third sub-tank are the positive-pressure sub-tanks 3 (3a and 3b) to supply liquid to the liquid discharge heads 8 (8a and 8b). The negative-pressure air tank 9 is connected to the first sub-tank and the fourth sub-tank. The positive-pressure air tank 10 is connected to the second sub-tank and the third sub-tank.

Other configurations are the same as in Example 23.

Example 25

Figure 19:
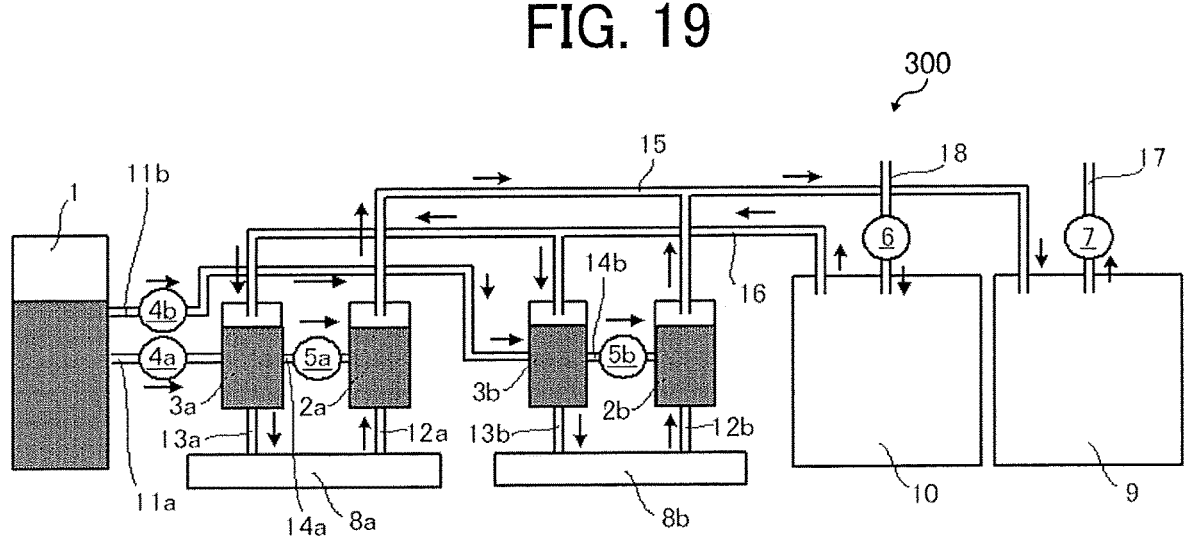
FIG. 19 is a schematic view illustrating an example of a configuration of a liquid supply device according to another variation of the ninth embodiment.

FIG. 19 illustrates the liquid supply device according to another variation of the ninth embodiment.

In the liquid supply device 300 of Example 23 described above, the main tank 1 is connected to the negative-pressure sub-tank 2a and the negative-pressure sub-tank 2b. However, in the liquid supply device 300 of the present example illustrated in FIG. 19, the main tank 1 is connected to the positive-pressure sub-tanks 3a and 3b.

In the liquid supply device 300 illustrated in FIG. 19, the second sub-tank and the fourth sub-tank are the negative-pressure sub-tanks 2 (2a and 2b) to collect liquid from the liquid discharge heads 8 (8a and 8b). The first sub-tank and the third sub-tank are the positive-pressure sub-tanks 3 (3a and 3b) to supply liquid to the liquid discharge heads 8 (8a and 8b). The negative-pressure air tank 9 is connected to the second sub-tank and the fourth sub-tank. The positive-pressure air tank 10 is connected to the first sub-tank and the third sub-tank.

Other configurations are the same as in Example 23.

Example 26

Figure 20:
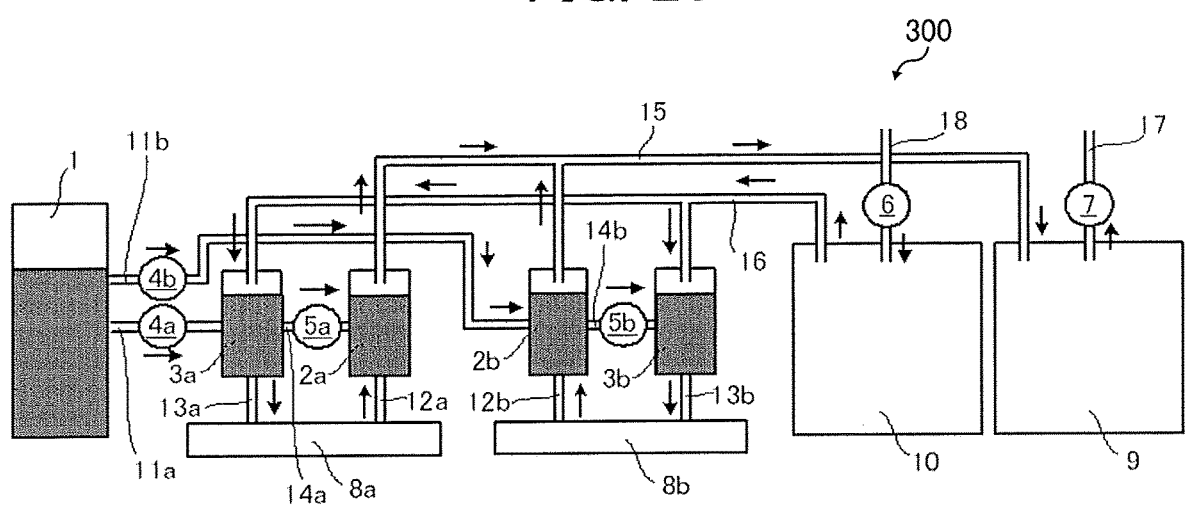
FIG. 20 is a schematic view illustrating an example of a configuration of a liquid supply device according to still another variation of the ninth embodiment.

FIG. 20 illustrates the liquid supply device according to another variation of the ninth embodiment.

In the liquid supply device 300 of Example 23 described above, the main tank 1 is connected to the negative-pressure sub-tank 2a and the negative-pressure sub-tank 2b. However, in the liquid supply device 300 of the present example illustrated in FIG. 20, the main tank 1 is connected to the positive-pressure sub-tank 3a and the negative-pressure sub-tank 2b.

In the liquid supply device 300 illustrated in FIG. 20, the second sub-tank and the third sub-tank are the negative-pressure sub-tanks 2 (2a and 2b) to collect liquid from the liquid discharge heads 8 (8a and 8b). The first sub-tank and the fourth sub-tank are the positive-pressure sub-tanks 3 (3a and 3b) to supply liquid to the liquid discharge heads 8 (8a and 8b). The negative-pressure air tank 9 is connected to the second sub-tank and the third sub-tank. The positive-pressure air tank 10 is connected to the first sub-tank and the fourth sub-tank.

Other configurations are the same as in Example 23.

As in the present embodiment (Examples 23 to 26), in the configuration in which the liquid supply device 300 includes a plurality of sub-tanks, a negative-pressure sub-tank(s) and a positive-pressure sub-tank(s) can be appropriately connected to increase the air volume in each sub-tank.

The increase in the air volume in each sub-tank can give a large air damper effect, thus reducing the pulsation width during circulation due to the driving of the pump and the occurrence of large pressure fluctuation during liquid discharge.

Tenth Embodiment

The liquid supply device 300 according to the present embodiment includes a plurality of negative-pressure sub-tanks 2, a negative-pressure air tank 9, a plurality of positive-pressure sub-tanks 3, a positive-pressure air tank 10, a decompression air pump 7, and a pressurizing air pump 6.

The plurality of negative-pressure sub-tanks 2 are communicated with each other. The negative-pressure air tank 9 is connected to the plurality of negative-pressure sub-tanks 2. The plurality of positive-pressure sub-tanks 3 are communicated with each other. The positive-pressure air tank 10 is connected to the plurality of positive-pressure sub-tanks 3. The decompression air pump 7 is connected to the negative-pressure air tank 9 to reduce the pressure of the negative-pressure air tank 9. The pressurizing air pump 6 is connected to the positive-pressure air tank 10 to pressurize the positive-pressure air tank 10.

The liquid supply device 300 according to the present embodiment further includes an additional negative-pressure air tank and an additional positive-pressure air tank.

Example 27

Figure 21:
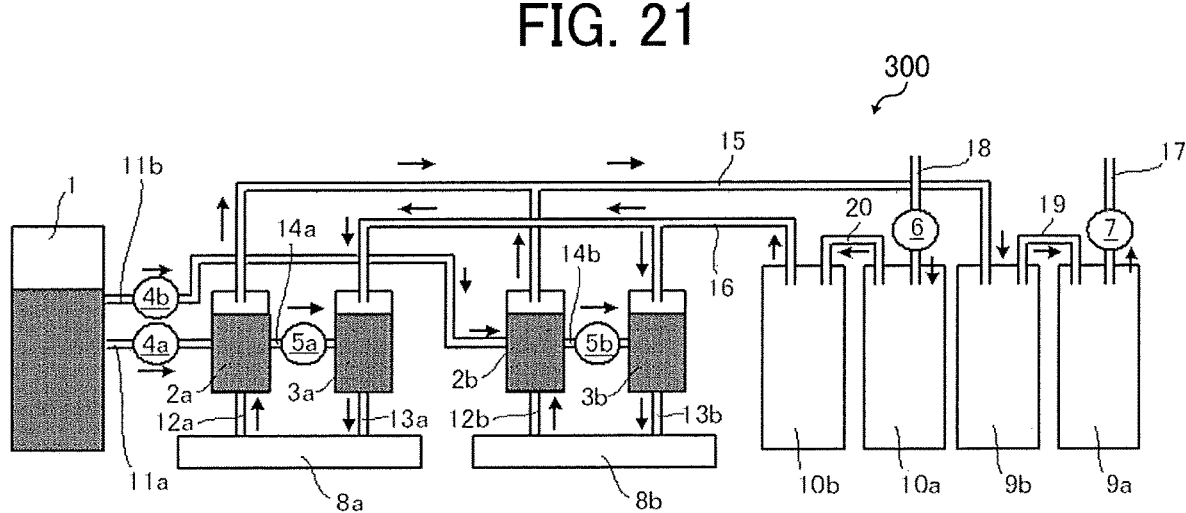
FIG. 21 is a schematic view illustrating an example of a configuration of a liquid supply device according to a tenth embodiment.

FIG. 21 illustrates an example of the liquid supply device according to the tenth embodiment.

The liquid supply device 300 illustrated in FIG. 21 includes an additional negative-pressure air tank 9b and an additional positive-pressure air tank 10b. The additional negative-pressure air tank 9b is connected between the negative-pressure air tank 9a and the negative-pressure sub-tanks 2 (2a and 2b). The additional positive-pressure air tank 10b is connected between the positive-pressure air tank 10a and the positive-pressure sub-tanks 3 (3a and 3b).

Other configurations may be the same as in Example 23.

A method of connecting the plurality of sub-tanks and the plurality of air tanks may be either serial or parallel, and can be appropriately selected according to the required volume and design restrictions. For example, as illustrated in FIG. 21, the liquid supply device 300 may include a plurality of positive-pressure sub-tanks 3 (3a and 3b) communicating in parallel, a plurality of positive-pressure air tanks 10 (10a and 10b) communicating in series and connected to the plurality of positive-pressure sub-tanks 3 (3a and 3b), a plurality of negative-pressure sub-tanks 2 (2a and 2b) communicating in parallel, and a plurality of negative-pressure air tanks 9 (9a and 9b) communicating in series and connected to the plurality of negative-pressure sub-tanks 2 (2a, 2b).

Connecting the plurality of air tanks in series is preferable from the viewpoint of miniaturization since the number and length of channels needed for connection to the sub-tanks can be reduced.

The liquid supply device 300 illustrated in FIG. 21 also includes a circulation channel 14a, a circulation channel 14b, a liquid circulation pump 5a, a liquid circulation pump 5b, a collection channel 12a, a collection channel 12b, a supply channel 13a, and a supply channel 13b. The circulation channel 14a connects the positive-pressure sub-tank 3a and the negative-pressure sub-tank 2a. The circulation channel 14b connects the positive-pressure sub-tank 3b and the negative-pressure sub-tank 2b. The liquid circulation pump 5a delivers liquid from the negative-pressure sub-tank 2a to the positive-pressure sub-tank 3a. The liquid circulation pump 5b delivers liquid from the negative-pressure sub-tank 2b to the positive-pressure sub-tank 3b. The collection channel 12a connects the negative-pressure sub-tank 2a and the liquid discharge head 8a. The collection channel 12b connects the negative-pressure sub-tank 2b and the liquid discharge head 8b. The supply channel 13a connects the positive-pressure sub-tank 3a and the liquid discharge head 8a. The supply channel 13b connects the positive-pressure sub-tank 3b and the liquid discharge head 8b.

The liquid supply device illustrated in FIG. 21 includes a first negative-pressure air channel 15, a decompression air pump 7, a second negative-pressure air channel 17, a third negative-pressure air channel 19, a first positive-pressure air channel 16, a pressurizing air pump 6, a second positive-pressure air channel 18, and a third positive-pressure air channel 20. The first negative-pressure air channel 15 connects the negative-pressure air tank 9a to the negative-pressure sub-tank 2a and 2b. The decompression air pump 7 reduces the pressure of the negative-pressure air tanks 9a and 9b. The second negative-pressure air channel 17 is communicated with the negative-pressure air tank 9b and connected to the decompression air pump 7. The third negative-pressure air channel 19 connects between the negative-pressure air tanks 9a and 9b. The first positive-pressure air channel 16 connects the positive-pressure air tank 10b to the positive-pressure sub-tanks 3a and 3b. The positive-pressure air pump 6 pressurizes the positive-pressure air tank 10. The second positive-pressure air channel 18 is communicated with the positive-pressure air tank 10 and connected to the pressurizing air pump 6. The third positive-pressure air channel 20 connects between the positive-pressure air tanks 10a and 10b.

As described above, in the configuration including the plurality of sub-tanks, connecting the plurality of air tanks to the plurality of sub-tanks can significantly increase the air volume in each sub-tank. Accordingly, a large air damper effect can be obtained, thus allowing reductions in the pulsation width during circulation due to the driving of the pump and the occurrence of large pressure fluctuations during liquid discharge. Accordingly, the occurrence of a discharge failure of the liquid discharge head can be prevented, thus preventing a decrease in image quality when the liquid discharge head is mounted on an image forming apparatus or liquid discharge apparatus.

In the present specification, the "liquid discharge apparatus" is an apparatus including a liquid discharge head or a liquid discharge unit that drives the liquid discharge head to discharge liquid. In addition to the above-described examples, examples of the liquid discharge apparatus include not only an apparatus capable of discharging liquid to a material to which the liquid may adhere but also a liquid discharge apparatus that discharges liquid toward gas or into liquid.

The "liquid discharge apparatus" may include a means relating to feeding, conveyance, and sheet ejection of the material to which the liquid may adhere and also include a pre-treatment apparatus and a post-processing apparatus.

The liquid discharge apparatus may be, for example, an image forming apparatus to form an image on a sheet by discharging ink, or a three-dimensional fabricating apparatus (solid-object fabricating apparatus) to discharge a fabrication liquid to a powder layer in which powder material is formed in layers, so as to form a three-dimensional fabrication object (solid fabrication object).

In addition, the liquid discharge apparatus is not limited to an apparatus that discharges liquid to produce meaningful visible images such as texts and figures For example, the liquid discharge apparatus may be an apparatus to form arbitrary images, such as arbitrary patterns, or fabricate three-dimensional images.

The above-described term "material on which liquid can be adhered" represents a material on which liquid is at least temporarily adhered, a material on which liquid is adhered and fixed, or a material into which liquid is adhered to permeate. Examples of the "material on which liquid can be adhered" include recording media such as a paper sheet, recording paper, and a recording sheet of paper, film, and cloth, electronic components such as an electronic substrate and a piezoelectric element, and media such as a powder layer, an organ model, and a testing cell. The "material on which liquid can be adhered" includes any material on which liquid adheres unless particularly limited.

Examples of the "material on which liquid can be adhered" include any materials on which liquid can be adhered even temporarily, such as paper, thread, fiber, fabric, leather, metal, plastic, glass, wood, and ceramic.

The "liquid" is not limited in particular as long as this has viscosity and surface tension such that this may be discharged from the head, but the viscosity is preferably 30 mPa·s or less at room temperature under a normal pressure, or by heating and cooling. More specifically, the liquid to be discharged is a solution, a suspension liquid, an emulsion, or the like containing a solvent such as water or an organic solvent, a colorant such as a dye or a pigment, a function-imparting material such as a polymerizable compound, a resin, or a surfactant, a biocompatible material such as deoxyribonucleic acid (DNA), amino acid, protein, or calcium, or an edible material such as a natural pigment, which can be used, for example, for an inkjet ink, a surface treatment liquid, a liquid for forming a constituent element of an electronic element or a light emitting element or an electronic circuit resist pattern, a three-dimensional modeling material liquid, or the like.

The "liquid discharge apparatus" includes an apparatus in which the liquid discharge head and the material to which the liquid may adhere move relative to each other; however, this is not limited to such an apparatus. Specific examples include a serial type apparatus which moves the liquid discharge head, and a line type apparatus which does not move the liquid discharge head.

The "liquid discharge apparatus" also includes a processing liquid applying apparatus which discharges a processing liquid onto paper for applying the processing liquid to the surface of the paper for the purpose of modifying the surface of the paper, an injection granulating apparatus which injects a composition liquid obtained by dispersing row materials in solution through a nozzle to granulate raw material fine particles.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

The invention claimed is:
1. A liquid supply device comprising:
a liquid discharge head configured to discharge liquid;
a main tank configured to store liquid to be supplied to the liquid discharge head;
a first sub-tank configured to store gas and liquid and connected to the main tank and the liquid discharge head;
a second sub-tank configured to store gas and liquid and connected to the first sub-tank and the liquid discharge head;
a first channel connecting between the main tank and the first sub-tank;
a degassing device configured to degas liquid in the first channel; and a second channel connecting between the second sub-tank and the first channel.

2. The liquid supply device according to claim 1, wherein the first sub-tank is a negative-pressure sub-tank configured to collect liquid from the liquid discharge head, and the second sub-tank is a positive-pressure sub-tank configured to supply liquid to the liquid discharge head.

3. The liquid supply device according to claim 2, further comprising:
a negative-pressure air tank connected to the negative-pressure sub-tank to supply a negative air pressure; and
a positive-pressure air tank connected to the positive-pressure sub-tank to supply a positive air pressure.

4. The liquid supply device according to claim 3, further comprising:
a decompression air pump connected to the negative-pressure air tank to reduce pressure of the negative-pressure air tank; and
a pressurizing air pump connected to the positive-pressure air tank to pressurize the positive-pressure air tank.

5. The liquid supply device according to claim 3, further comprising:
an additional negative-pressure air tank connected between the negative-pressure air tank and the negative-pressure sub-tank; and
an additional positive-pressure air tank connected between the positive-pressure air tank and the positive-pressure sub-tank.

6. The liquid supply device according to claim 1, wherein the first sub-tank is a positive-pressure sub-tank configured to supply liquid to the liquid discharge head, and the second sub-tank is a negative-pressure sub-tank configured to collect liquid from the liquid discharge head.

7. The liquid supply device according to claim 1, further comprising:
a first liquid supply pump connected between the main tank and the first sub-tank to supply liquid from the main tank to the first sub-tank; and
a second liquid supply pump connected to the first sub-tank and the second sub-tank to supply liquid from the first sub-tank to the second sub-tank.

8. The liquid supply device according to claim 1, wherein the second channel includes a channel resistance configured to control a flow rate of liquid in the second channel.

9. The liquid supply device according to claim 1, wherein the second channel includes an electromagnetic valve configured to control a flow rate of liquid in the second channel.

10. The liquid supply device according to claim 1, wherein the second channel includes a degassing pump configured to control a flow rate of liquid in the second channel.

11. A liquid supply device comprising:
a liquid discharge head configured to discharge liquid;
a main tank configured to store liquid to be supplied to the liquid discharge head;
a first sub-tank configured to store gas and liquid and connected to the main tank and the liquid discharge head;
a second sub-tank configured to store gas and liquid and connected to the first sub-tank and the liquid discharge head;
a first channel connecting between the main tank and the first sub-tank;

a degassing device configured to degas liquid in the first channel; and
a second channel connecting between the second sub-tank and the main tank.

12. The liquid supply device according to claim 11, wherein the first sub-tank is a negative-pressure sub-tank configured to collect liquid from the liquid discharge head, and the second sub-tank is a positive-pressure sub-tank configured to supply liquid to the liquid discharge head.

13. The liquid supply device according to claim 12, further comprising:
a negative-pressure air tank connected to the negative-pressure sub-tank to supply a negative air pressure; and
a positive-pressure air tank connected to the positive-pressure sub-tank to supply a positive air pressure.

14. The liquid supply device according to claim 13, further comprising:
a decompression air pump connected to the negative-pressure air tank to reduce pressure of the negative-pressure air tank; and
a pressurizing air pump connected to the positive-pressure air tank to pressurize the positive-pressure air tank.

15. The liquid supply device according to claim 13, further comprising:
an additional negative-pressure air tank connected between the negative-pressure air tank and the negative-pressure sub-tank; and
an additional positive-pressure air tank connected between the positive-pressure air tank and the positive-pressure sub-tank.

16. The liquid supply device according to claim 11, wherein the first sub-tank is a positive-pressure sub-tank configured to supply liquid to the liquid discharge head, and the second sub-tank is a negative-pressure sub-tank configured to collect liquid from the liquid discharge head.

17. The liquid supply device according to claim 11, further comprising:
a first liquid supply pump connected between the main tank and the first sub-tank to supply liquid from the main tank to the first sub-tank; and
a second liquid supply pump connected to the first sub-tank and the second sub-tank to supply liquid from the first sub-tank to the second sub-tank.

18. The liquid supply device according to claim 11, wherein the second channel includes a channel resistance configured to control a flow rate of liquid in the second channel.

19. The liquid supply device according to claim 11, wherein the second channel includes an electromagnetic valve configured to control a flow rate of liquid in the second channel.

20. The liquid supply device according to claim 11, wherein the second channel includes a degassing pump configured to control a flow rate of liquid in the second channel.

21. A liquid supply device comprising:
a liquid discharge head configured to discharge liquid;
a main tank configured to store liquid to be supplied to the liquid discharge head;
a first sub-tank configured to store gas and liquid and connected to the main tank and the liquid discharge head;
a second sub-tank configured to store gas and liquid and connected to the first sub-tank and the liquid discharge head;

a first channel connecting between the main tank and the first sub-tank;
a first degassing device configured to degas liquid in the first channel;
a second channel connecting between the second sub-tank and the first sub-tank to supply liquid from the second sub-tank to the first sub-tank; and
a second degassing device configured to degas liquid in the second channel.

22. The liquid supply device according to claim 21, wherein the first sub-tank is a negative-pressure sub-tank configured to collect liquid from the liquid discharge head, and the second sub-tank is a positive-pressure sub-tank configured to supply liquid to the liquid discharge head.

23. The liquid supply device according to claim 22, further comprising:
a negative-pressure air tank connected to the negative-pressure sub-tank to supply a negative air pressure; and
a positive-pressure air tank connected to the positive-pressure sub-tank to supply a positive air pressure.

24. The liquid supply device according to claim 23, further comprising:
a decompression air pump connected to the negative-pressure air tank to reduce pressure of the negative-pressure air tank; and
a pressurizing air pump connected to the positive-pressure air tank to pressurize the positive-pressure air tank.

25. The liquid supply device according to claim 23, further comprising:
an additional negative-pressure air tank connected between the negative-pressure air tank and the negative-pressure sub-tank; and
an additional positive-pressure air tank connected between the positive-pressure air tank and the positive-pressure sub-tank.

26. The liquid supply device according to claim 21, wherein the first sub-tank is a positive-pressure sub-tank configured to supply liquid to the liquid discharge head, and the second sub-tank is a negative-pressure sub-tank configured to collect liquid from the liquid discharge head.

27. The liquid supply device according to claim 21, further comprising:
a first liquid supply pump connected between the main tank and the first sub-tank to supply liquid from the main tank to the first sub-tank; and
a second liquid supply pump connected to the first sub-tank and the second sub-tank to supply liquid from the first sub-tank to the second sub-tank.

28. The liquid supply device according to claim 21, wherein the second channel includes a channel resistance configured to control a flow rate of liquid in the second channel.

29. The liquid supply device according to claim 21, wherein the second channel includes an electromagnetic valve configured to control a flow rate of liquid in the second channel.

* * * * *